United States Patent
Panasko et al.

(10) Patent No.: US 9,804,940 B2
(45) Date of Patent: Oct. 31, 2017

(54) TECHNIQUES FOR MAINTAINING DEVICE COORDINATION IN A STORAGE CLUSTER SYSTEM

(71) Applicant: NETAPP, INC., Sunnyvale, CA (US)

(72) Inventors: Brian Panasko, Pittsburgh, PA (US); Tom Snyder, Pittsburgh, PA (US); Chad Moore, Pittsburgh, PA (US)

(73) Assignee: NetApp, Inc., Sunnyvale, CA (US)

( * ) Notice: Subject to any disclaimer, the term of this patent is extended or adjusted under 35 U.S.C. 154(b) by 25 days.

(21) Appl. No.: 14/928,282

(22) Filed: Oct. 30, 2015

(65) Prior Publication Data

US 2017/0123945 A1 May 4, 2017

(51) Int. Cl.
*G06F 11/20* (2006.01)
*G06F 3/06* (2006.01)

(52) U.S. Cl.
CPC .......... *G06F 11/2094* (2013.01); *G06F 3/067* (2013.01); *G06F 3/0619* (2013.01); *G06F 3/0659* (2013.01); *G06F 2201/805* (2013.01)

(58) Field of Classification Search
CPC ............. G06F 11/2025; G06F 11/2028; G06F 11/2035; G06F 11/2056; G06F 11/3006; G06F 11/3048; G06F 11/3093; G06F 2209/508; G06F 2209/503; H04L 41/0813; H04L 41/0823; H04L 41/24
See application file for complete search history.

(56) References Cited

U.S. PATENT DOCUMENTS

| | | | | |
|---|---|---|---|---|
| 6,163,855 A * | 12/2000 | Shrivastava | ........ | G06F 11/1443 709/208 |
| 7,076,783 B1 * | 7/2006 | Frank | .................. | H04L 41/0893 709/220 |
| 7,478,263 B1 * | 1/2009 | Kownacki | .......... | G06F 11/2028 714/10 |
| 7,739,677 B1 * | 6/2010 | Kekre | ................. | G06F 11/1425 709/214 |
| 8,639,878 B1 * | 1/2014 | Chatterjee | ........... | G06F 11/1096 711/114 |
| 8,743,680 B2 * | 6/2014 | Brown | ................ | H04L 41/0659 370/218 |
| 2009/0177914 A1 * | 7/2009 | Winchell | ............ | G06F 11/1492 714/4.1 |
| 2014/0304399 A1 * | 10/2014 | Chaudhary | ......... | H04L 41/5009 709/224 |

* cited by examiner

*Primary Examiner* — Nadeem Iqbal
(74) *Attorney, Agent, or Firm* — LeClairRyan, a Professional Corporation

(57) ABSTRACT

Various embodiments are generally directed to techniques for maintaining and using a quorum of nodes within a cluster of a storage cluster system to perform coordinated operations. An apparatus includes a node of multiple nodes of a storage cluster system, each node to oversee a copy of client data and a first node to serve as a tie breaker node in determinations of whether there is a quorum; a quorum coordination component to determine a current status of the quorum, and coordinate performance of a coordinated operation among the multiple nodes to alter the copies of the client data based on the current status of the quorum; and a tie breaker reassignment component to analyze the indications to determine whether the first node has failed and reassign the tie breaker node from the first node to a second node in response to a determination that the first node has failed.

17 Claims, 17 Drawing Sheets

2200

TECHNIQUES FOR MAINTAINING DEVICE COORDINATION IN A STORAGE CLUSTER SYSTEM

BACKGROUND

Remotely accessed storage cluster systems may be made up of multiple nodes controlling multiple sets of storage devices to provide a combination of speed of access and redundancy of components to prevent data loss. The multiple nodes may coordinate actions taken by each in response to requests to perform various operations, including requests from client devices to perform various coordinated storage operations and/or internally generated requests to perform various coordinated maintenance operations. In response to each such request, determinations may be made among the nodes as to whether or not to perform one or more coordinated operations associated with each request.

DETAILED DESCRIPTION

Figure 1A:
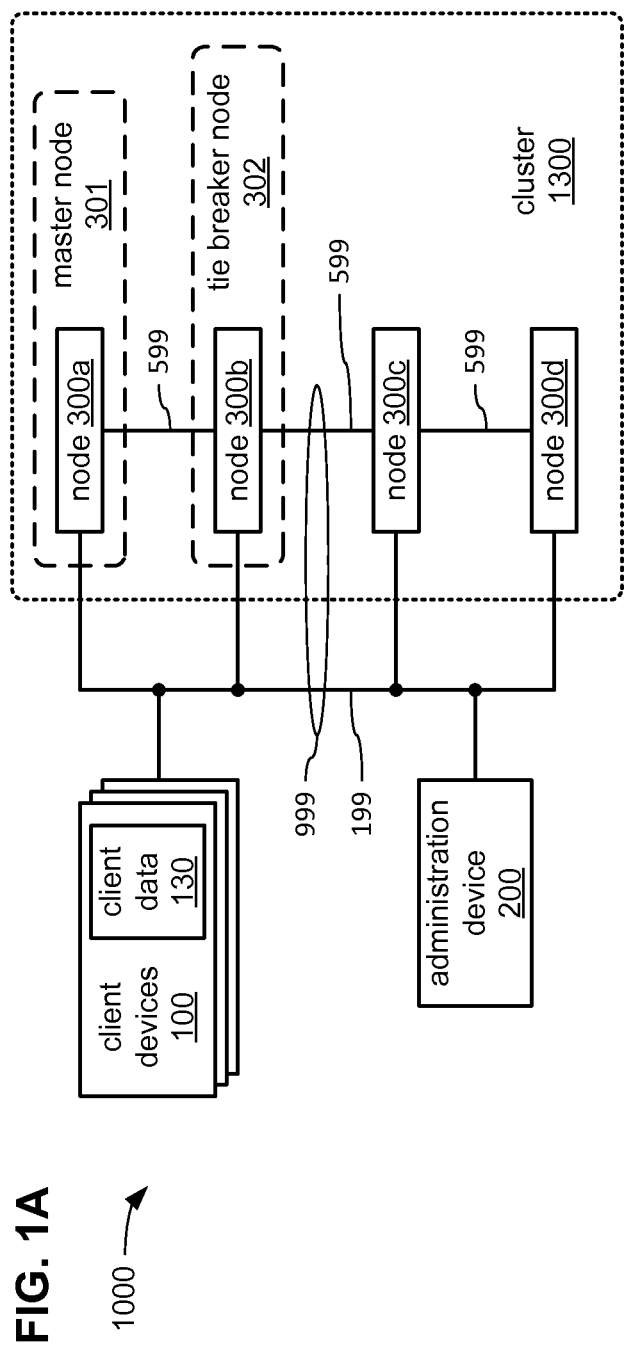
FIGS. 1A and 1B each illustrate an example embodiment of a storage cluster system.

Various embodiments are generally directed to techniques for maintaining and using a quorum of nodes within a cluster of a storage cluster system to perform coordinated operations. A master node selected from among the nodes of the cluster may recurringly perform a check of whether there is a quorum of nodes of the cluster available to perform coordinated operations. The master node may perform such a check on a recurring interval and/or in response to receiving a request to perform a coordinated operation. If, upon receipt of the request, the master node determines or has already earlier determined that a quorum is not available, then the master node may respond to the request with an indication that the request is rejected. However, if, upon receipt of such a request, the master node determines or has already earlier determined that a quorum is available, then the master node may distribute commands to perform the coordinated operation to the other nodes of the cluster to cause each of the other nodes to perform the coordinated operation at least partially in parallel with the master node. If at least a quorum of the nodes, including the master node, is able to perform the coordinated operation, then the master node may respond to the request with an indication that the request is accepted. However, if less than a quorum of the nodes, including the master node, is able to perform the coordinated operation, then the master node may distribute an indication to all of the nodes of the cluster to cancel their performances of the coordinated operation, and may respond to the request with an indication that request is rejected.

The manner in which the master node determines whether a quorum of the nodes of the cluster are able to perform the coordinated operation that is requested in the received request may be via a "vote" among the nodes of the cluster, including the master node. More specifically, after distributing commands to perform the coordinated operation among the other nodes, each of the other nodes may each individually determine whether each is able to perform the coordinated operation, and may then each individually transmit an indication of that determination back to the master node. Each of these indications received by the master node of whether one of the other nodes is able to perform the coordinated operation is treated by the master node as a vote cast by one of the other nodes. The master node, itself, may also determine whether it is able to perform the coordinated operation, and the results of that determination may be treated as a vote cast by the master node.

If a quorum of the nodes of the cluster cast a vote indicating that they are able to perform the coordinated operation, then the request to perform the coordinated operation is accepted, and the master node may transmit an indication to the source of the request indicating that the request has been accepted such that the coordinated operation will be performed. However, if less than a quorum of the nodes of the cluster cast a vote indicating that they are able to perform the coordinated operation, then the request to perform the coordinated operation is rejected. As a result of the rejection, the master node may transmit a command to the other nodes to cancel and/or to discontinue performance of the coordinated operation, and the master node may transmit an indication to the source of the request indicating that the request has been rejected such that the coordinated operation will not be performed. Thus, it is the master node that coordinates the performance of such voting among the nodes of a cluster, in addition to recurringly performing a check that there is a quorum of the nodes available to perform coordinated operations.

Each of the nodes of the cluster may oversee the storage of a copy of the client data in one or more storage devices, and each of those copies of the client data may be required to be kept synchronized with the other copies such that all of the copies of the client data are required to be kept in the same state to the extent possible. Where differences between copies develop due to malfunctions or other events associated with individual ones of the nodes, various operations may be performed to update the state of copies of the client data that cease to be synchronized with the state of the other copies of the client data. Thus, any operation that is requested by a client device to store or otherwise alter the client data may be required to be performed in a coordinated manner (i.e., as a coordinated operation) by all of the nodes as part of maintaining all of the copies of the client data that each oversees in the same synchronized and up to date state.

Such coordination may be performed at least partly in parallel among the nodes of a cluster.

In some embodiments, pairs of the nodes of the cluster may be more organized into high-availability (HA) pairs in which such paired nodes may share access to the same one or more storage devices and/or in which such paired nodes recurringly monitor each other as part of being ready for one to take over for the other in the event of a malfunction. With such shared one or more storage devices, each of the nodes of a HA pair may store and oversee a separate one of a pair of side-by-side copies of the client data. In normal operation, each of the nodes of a HA pair may perform operations on its associated one of the side-by-side copies of the client data independently of the other of the two nodes. However, where one of the nodes of a HA pair fails, the other node of the HA pair may perform duplicate operations on each of the two side-by-side copies of the client data to keep both copies in synchronization with each other.

Each of the nodes of the cluster may also store a copy of node status data that indicates aspects of the current state of each of the nodes of the cluster. More specifically, each of the copies of the node status data may indicate the degree of functionality of each of the nodes and/or which functions are available in each of the nodes. Alternatively or additionally, each of the copies of the node status data may indicate which node is the master node that is in communications with client devices and that coordinates votes among the nodes, and/or may indicate which node is the tie breaker node relied upon to break ties that may arise in determining whether a quorum is available and/or during voting. Like the client data, each of the copies of the node status data may be required to be kept synchronized with the other copies such that all of the copies of the node status data are required to be kept in the same state to the extent possible. Thus, any operation that is requested by a node to alter the node state data may be required to be performed in a coordinated manner by all of the nodes as part of maintaining all of the copies of the node state data in the same synchronized and up to date state. In embodiments in which the nodes are organized into HA pairs, each of the nodes of a HA pair may store and oversee a separate one of a pair of side-by-side copies of the node status data in a manner similar to the side-by-side copies of the client data. In some of those embodiments, where one of the nodes of a HA pair fails, the other node of the HA pair may perform duplicate operations to on each of the two side-by-side copies of the node status data to keep both copies in synchronization with each other. However, in others of those embodiments, and as will be explained in greater detail, an entirely different mechanism may be employed to bring the copy of at least node status data up to date once a node of a HA pair that has failed has been restored to normal operation.

In various embodiments, various different mechanisms may be employed to perform the check of whether there is a quorum of the nodes of the cluster available to perform coordinated operations. In some embodiments, the master node may transmit a command or other form of trigger to the other nodes to each transmit an indication of their availability back to the master node. What each of the other nodes transmits back to the master node in response to such a trigger may be treated by the master node as a "heartbeat" signal in the sense that the ability of a node to transmit any signal at all back to the master node may be taken by the master node as an indication of that node being available to be a member of a quorum. However, if a predetermined period of time elapses from when a heartbeat signal was expected to be received from a node, then the lack of receipt of a heartbeat signal within that predetermined period of time may be taken by the master node as an indication of that node not being available to be a member of a quorum. Alternatively or additionally, what each of the other nodes transmits back to the master node in response to such a trigger may include one or more indications of the operating condition of a node, including an indication of whether that node is functional enough to be available to be a member of a quorum. Thus, it may be that a node is functional enough to respond to the master node with an indication of whether or not it is available to be a member of a quorum, but not functional enough to actually be so available. The master node may then transmit to all of the other nodes an indication of whether there is currently a quorum and/or which of the nodes of the cluster are within that quorum based on what the master node has received and/or not received from the other nodes.

In other embodiments, the master node may not transmit a command or other form of trigger to the other nodes as part of the performance of a check as to whether there is a quorum. Alternatively or additionally, the master node may not be the sole recipient of heartbeat signals and/or signals conveying indications of degree of functionality from others of the nodes. Instead, each of the nodes of the cluster may more autonomously transmit indications of their own condition to the master node and/or others of the nodes. Thus, the exchange of "heartbeat" signals and/or signals indicating degrees of functionality and/or availability to be a member a quorum may not be centrally triggered. Where each node transmits its heartbeat signal and/or a signal conveying indications of its functionality to all of the other nodes, such broadcast exchanges of such signals may enable each node to independently determine whether there is currently a quorum and/or which of the nodes of the cluster are available to be within that quorum.

Regardless of whether each node recurringly receives indications of whether there is a quorum and/or which of the nodes are available to be within that quorum from the master node or from multiple ones of the nodes, each node may use such received information to update such information in its copy of the node state data. Also, and as will be explained in greater detail, a node may transmit a preemptive indication that it is about to become unavailable to be a member of a quorum to the master node and/or to all of the other nodes. Each of the nodes, in response, may also update their copies of the node status data with an indication that the transmitting node is about to become so unavailable. As will be explained in greater detail, at least some of such updates to the copies of the node status data may be conditioned on various interlocks coordinating activity among the nodes and/or may be performed as a coordinated operation conditioned on the outcome of a vote among the nodes.

The master node may serve as the recipient of requests to perform coordinated operations, either from a client device or from one of the other nodes of the cluster. Thus, the master node may be coupled to both client devices and the other nodes of the cluster through one or more networks to enable the master node to receive such requests. Such requests may include a request for storage services from a client device. As will be explained in greater detail, the master node may translate such a request for storage services into one or more coordinated operations to be performed by the nodes. Alternatively or additionally, such requests may include a request for one or more coordinated operations from one of the other nodes as part of performing one or more maintenance and/or data transfer tasks, such as updating the node state data. Also alternatively or additionally, another of the nodes of the cluster may receive a request for storage services from a client device and may relay that request to the master node.

Regardless of where a request is received from, upon receiving a request to perform a coordinated operation, the master node may first refer to its copy of the node status data to determine whether there is a quorum of all of the nodes of the cluster that are able to participate in a vote to determine whether or not to accept the request to perform the coordinated operation. Again, the information within that copy of the node status data of whether there is a quorum and/or which of the nodes are available such that they are within that quorum may be based on the results of the aforedescribed exchanges of heartbeat and/or other signals among the nodes. Also again, such exchanges of heartbeat and/or other signals may be performed on a recurring basis (e.g., at a recurring interval) and/or in response to the receipt of at least some requests to perform a coordinated operation. Such use by the master node of its copy of the nodes status data to determine whether or not to accept the request may be done to satisfy a requirement in some embodiments that a quorum of the nodes is required before a request to perform a coordinated operation can be accepted. Thus, in such embodiments, the master node may refrain from contacting any of the other nodes concerning the request if such a quorum does not exist, and instead, may transmit a response to the client device or to the node from which the request was received that the request is rejected.

However, where such a quorum of the nodes of the cluster does exist or in other embodiments in which a quorum is not required to perform a coordinated operation, the master node may proceed with transmitting a command to perform the coordinated operation to the other nodes. The master node then awaits receipt of the indications from the other nodes as to whether each is able to perform the coordinated operation, and may treat each of those indications as a vote to which the master node may add its own vote based on whether it is able to perform the coordinated operation. If there is a quorum of the nodes indicating that they are able to perform the coordinated operation, then the master node may signal all of the nodes with an indication that the coordinated operation is to be performed and/or may signal the client device or node from which the request was received that the request is accepted. As a result, all of the nodes that are able to perform the coordinated operation then do so. However, if there isn't a quorum of the nodes indicating that they are able to perform the coordinated operation, then the master node may signal all of the nodes that the coordinated operation is not to be performed and/or may signal the client device or node from which the request was received that the request is rejected.

In addition to one of the nodes serving in such a role of master node, either the same node or another of the nodes may serve in the role of a tie breaker node. As familiar to those skilled in the art, both the recurring determination as to whether there is a quorum of the nodes available to perform coordinated operations and the votes to determine whether a request to perform a particular coordinated operation is accepted or rejected may be affected by instances in which there is a tie. More specifically, there may be instances in which exactly half of the nodes of the cluster are available to perform a coordinated operation and/or there may be instances in which exactly half of the nodes cast a vote indicating that they are able to perform a particular coordinated operation. By way of example, a combination of nodes of the cluster having been shut down, failures occurring within nodes of the cluster, nodes of the cluster having been cut off from the master node by network communications problems, etc. may bring about a situation in which there is such a tie between equal numbers of nodes.

To address this, the master node may treat the tie breaker node as having an additional fractional weight value "epsilon" that gives the tie breaker node an overall weight value greater than any of the other nodes, but less than the overall weight value of any two of the other nodes put together. The master node may take this additional fractional weight value epsilon given to the tie breaker node into account both in determining whether there is a quorum and in counting the votes cast by each of the nodes. Stated differently, for purposes of determining whether there is a quorum, the additional weight value epsilon given to the tie breaker node may cause the master node to count the tie breaker node as more than one node, but less than two nodes, while all of the other nodes are each counted as one node. Also, for purposes of voting, the vote cast by the tie breaker node to indicate whether it is able to perform a coordinated operation, or not, may be treated by the master node as having a weight of more than one vote, but less than two votes, while the votes cast by all of the other nodes are each weighted as a single vote.

In different embodiments, the master node and the tie breaker node may or may not be the same node. It may be that one or both of the master node and the tie breaker node are automatically selected using different criteria. The master node may be a node that is selected to engage in communications with one or more client devices to receive requests for storage services therefrom. Thus, such selection of the master node may be at least partly based on the quality of service available in its network connections to one or more client devices to receive such requests and/or the quality of service available in its network connections to the other nodes to coordinate the voting thereamong. The tie breaker node may be a node that is selected based on a determination of being less likely than the other nodes to fail to the extent of becoming incapable of casting a vote. Thus, such selection of the tie breaker node may be at least partly based on the degree to which its processing resources are currently utilized in comparison to the degree to which the processing resources of one or more of the other nodes are utilized. In some embodiments, an initial selection of one or both of the master node and the tie breaker node may be made by an administrator through use of an administration device in communication with one or more of the nodes. Regardless of the manner in which initial selections of the master and tie breaker nodes are made, the master and/or tie breaker nodes may be subsequently changed via a vote among the nodes.

To maintain the ability of the nodes of the cluster to determine whether a quorum exists, to carry out voting to determine whether to perform a coordinated operation, and/or to break a tie that may occurring while making either of these determinations, one or more of the nodes may cooperate to reassign the roles of the master node and/or the tie breaker node thereamong in response to instances of failure in the current master node and/or in the current tie breaker node. Regarding reassignment of the role of the master node, in a cluster in which the nodes are organized into HA pairs, if the current master node fails, its partner node in the HA pair to which the master node belongs may automatically assume the role of the master node, at least temporarily, to prevent loss of communications with client devices. Alternatively or additionally, the role of the master node may automatically transition to another node earlier designated in configuration data received from an administrator of the storage cluster system. Also alternatively or additionally, which node is to be assigned the role of the master node may be automatically determined based on various criteria, including indications reflected in the node status data as to the relative degree of functionality and/or function availability, and/or the relative quality of service in the network connections that each node has with the other nodes and/or with the client devices. Such quality of service in network connections may be deemed an important criterion to ensure that the ability to maintain communications with the client devices to receive requests and/or to maintain communications with the other nodes to coordinate and receive votes are taken into account.

Regarding reassignment of the role of the tie breaker node, if the current tie breaker node fails, the role of the tie breaker node may automatically transition to another node earlier designated in configuration data received from an administrator of the storage cluster system. Alternatively or additionally, which node is to be assigned the role of the tie breaker node may be automatically determined based on various criteria, including indications reflected in the node status data as to the relative degree of use of processing resources within each node, and/or the relative quality of service in the network connections that each node has with the other nodes. The degree of use of processing resources within each node may be deemed an important criterion to take into as it may be deemed desirable to ensure that the processing resources of the new tie breaker node are not so engaged in other tasks as to become unavailable for remaining part of a quorum such that use may be made of the epsilon weighting value in performing the tie breaker function. Given this criterion, in embodiments in which the nodes are organized into HA pairs, reassignment of the role of the tie breaker node to a node that has taken over for a failed partner node in a HA pair may be automatically avoided based on the presumption that a node that has taken over for a failed partner node in a HA pair may be engaged in many more tasks as a result of overseeing the copy of the client data associated with the failed partner node in addition to overseeing its own copy of the client data.

Also to maintain the ability of the nodes of the cluster to determine whether there is a quorum, to carry out voting, and/or to have the benefit of the epsilon weighting value to break a tie, one or more of the nodes may refuse to perform or may provide a warning against performing an operation commanded by an administrator that may cause loss of functionality of the cluster. For example, at various times, an administrator of the storage cluster system may command a node of the cluster to shut down and/or to perform any of a variety of other operations that may make that node unavailable to perform various functions, including serving as either the master node or the tie breaker node, and/or remaining available to be a member of a quorum. More specifically, upon receiving such a command, the node may analyze the indications of which node is the master node, which node is the tie breaker node, and/or what nodes of the cluster are currently available to be a member of a quorum to determine whether or not becoming unavailable itself will affect the cluster in a manner that causes the loss of the master node, the loss of the tie breaker node and/or the loss of a quorum. If one or more of such a losses would be suffered by the cluster as a result of the node becoming unavailable, then the node may respond to the command with a refusal to carry out the command. Alternatively or additionally, if the node becoming unavailable would cause the cluster to become close to suffering one or more of such a losses with the occurrence of just one more failure in any of the other nodes, then the node may respond to the command with a warning of the situation and a request for confirmation to proceed with the command, anyway.

Further, in embodiments in which indications are preemptively transmitted to other nodes when a node is about to become unavailable to remain part of a quorum, and where the receipt of such preemptive indications are reflected in the copies of the node status data maintained by each node, such indications of the node status data may be taken into account by a node that is determining what effect its own unavailability will have on the cluster. More specifically, where a node has been commanded to perform an operation that will make it unavailable for remaining a member of a quorum, the node may take into account such preemptive indications from other nodes in determining whether obeying such a command will deprive the cluster of the master node, the tie breaker node and/or a quorum.

Still further, an interlocking protocol may be employed among the nodes to control the making of such determinations and the transmission of such preemptive indications as part of preventing occurrences of a race condition of multiple ones of the nodes making such determinations and transmitting such notices. More specifically, such an interlocking protocol may entail the use of a single token that must be requested and then given to a node before it makes such a determination and/or transmits such a preemptive indication to the other nodes for those other nodes to use in updating their copies of the node status data. As a further assurance against race conditions occurring, such updating of the copies of the node status data to reflect such a preemptive indication may be required to be made as a coordinated operation. Thus, a node transmitting such a preemptive indication may be required to do so as a request for a coordinated operation to the master node. Upon receipt, the master node may then condition the performance of that coordinated operation on whether there is a quorum and/or whether a quorum of the nodes indicate that they have the ability to perform the coordinated operation, as previously described.

It should be noted that, in some embodiments, the nodes of the cluster may cooperate to maintain multiple parallel quorums. Each such quorum may be associated with a different aspect of operation of the nodes. By way of example, each quorum may be associated with a different type of coordinated operation, a different type of data maintained by all of the nodes, etc. Thus, by way of example, a coordinated operation to store more client data as part of each of the copies of client data overseen by each of the nodes may be associated with one quorum of the nodes, while a coordinated operation to perform an update of the copies of the node status data maintained by all of the nodes may be associated with another quorum of the nodes. While these different quorums may generally coincide as regards which nodes are included in each quorum, there may be occasions in which one or more of the quorums may not coincide with the others. By way of example, where a node experiences a failure that impedes access to its copy of the client data, but not access to its copy of the node status data, then that node may cease to be available to remain within a quorum associated with coordinated operations affecting the client data, but may still remain a member of the quorum associated with coordinated operations affecting the node status data. In such embodiments, the master node may need to determine which quorum is associated with a requested coordinated operation as part of determining whether there is a quorum of the nodes available to perform that requested coordinated operation and/or to conduct a vote to determine whether or not to perform that requested coordinated operation. Also, in such embodiments, a node that has been commanded to perform an operation that will render it unavailable for voting and/or to perform coordinated operations may need to evaluate the effect of its unavailability separately for each quorum of multiple quorums that are associated with a different aspects of operation.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 1B:
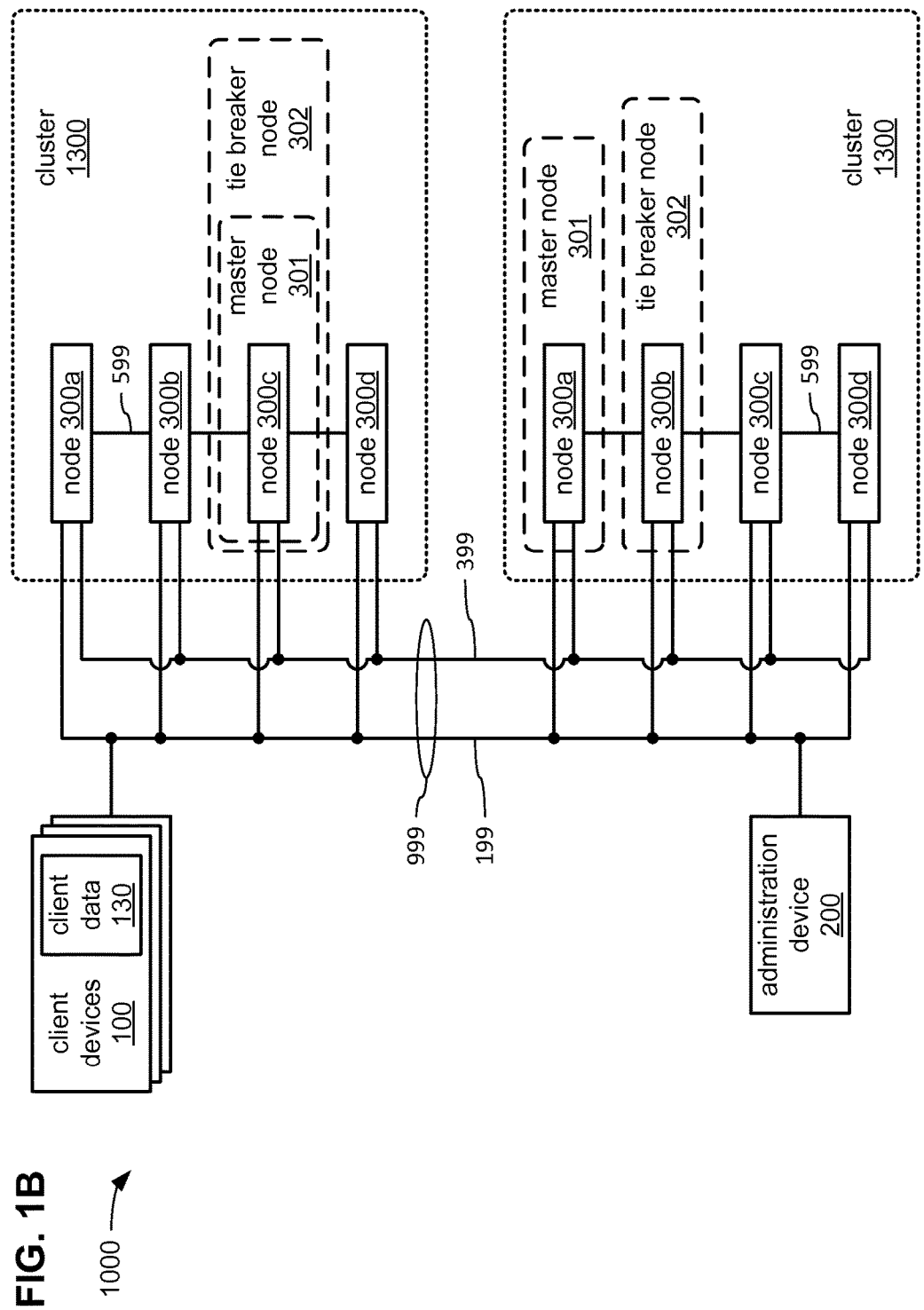

FIGS. 1A and 1B each illustrate a block diagram of an example embodiment of a storage cluster system 1000 incorporating one or more client devices 100, an administration device 200, and/or at least one cluster 1300 that incorporates one or more nodes 300 that each oversee the storage of a separate copy of client data 130 provided by the one or more client devices 100 within one or more storage devices (not shown) to provide a degree of redundancy. More specifically, FIG. 1A depicts an example embodiment that includes a single cluster 1300 that incorporates four nodes 300 (individually labeled as 300a-d for ease of discussion), while FIG. 1B depicts an example embodiment that includes multiple clusters 1300 that each incorporate four nodes 300 (again, individually labeled as 300a-d for ease of discussion). It should be noted that despite the specific depiction of four nodes 300 within each of the depicted clusters 1300, other embodiments are possible in which each cluster 1300 may include larger or smaller quantities of the nodes 300. It should also be noted that despite the specific depiction of a single cluster 1300 in one example embodiment and a pair of clusters 1300 in another example embodiment, other embodiments are possible that may include a still large quantity of clusters 1300.

Referring to both FIGS. 1A and 1B, various aspects of the manner in which the copies of the client data 130 provided by the one or more client devices 100 are stored in the storage cluster system 1000 may be controlled by an administrator of the storage cluster system 1000 by operating the administration device 200 in communication with one or more of the nodes 300a-d of one or more clusters 1300. In various embodiments, different ones of the nodes 300a-d and/or different clusters 1300 (where there is more than one cluster 1300) may be positioned at geographically distant locations to enhance such provision of redundancy by limiting the potential for loss of the client data due to a localized event.

As depicted, all of the nodes 300a-d of each cluster 1300 may communicate with the client devices 100 and/or the administration device 200 via a client interconnect 199. Also, in embodiments that include more than one cluster 1300, various nodes 300a-d of one cluster 1300 may communicate with various nodes 300a-d of another cluster 1300 via an inter-cluster interconnect 399. Further, within each cluster 1300, the nodes 300a-d may communicate with each other through an intra-cluster interconnect 599. As depicted, in some embodiments, the interconnects 199, 399 and/or 599 may extend through the same network 999. Each of the interconnects 199 and 399 may be implemented as virtual private networks (VPNs) defined using any of a variety of network security protocols through the network 999. The network 999 may be a single network limited to extending within a single building or other relatively limited area, may include a combination of connected networks extending a considerable distance, and/or may include the Internet. As an alternative to coexisting within the same network 999, the interconnects 199, 399 and/or 599 may be implemented as entirely physically separate networks. By way of example where there are multiple clusters 1300, the client interconnect 199 may extend through the Internet to enable the client devices 100 and/or the administration device 200 to be positioned at geographically diverse locations, while the inter-cluster interconnect 399 may extend through a leased line between the geographically distant locations at which different ones of two different clusters 1300 are positioned.

Turning to FIG. 1A, within at least one cluster 1300, one of the nodes 300a-d may be selected to serve as a master node 301 to receive requests to perform coordinated operations affecting copies of the client data 130 and/or other data overseen by each of the nodes 300a-d. Such requests may include requests for storage services received via the client interconnect 199 from one or more of the client devices 100 to store, retrieve, delete, edit, etc. the client data 130 in storage devices (not shown) that are coupled to and operated by each of the nodes 300a-d. Alternatively or additionally, such requests may include requests received from others of the nodes 300a-d via the intra-cluster interconnect 599 to store, modify, etc. other data concerning various aspects of the operation of the storage cluster system 1000 to store the client data 130.

As previously discussed, all of the copies of the client data 130 (as well as other data) overseen by each of the nodes 300a-d may be required to be kept synchronized such that all of those copies are in identical condition. To do so, operations performed by each of the nodes 300a-d that entail modifying the client data 130 (and/or other data also stored as multiple copies) in some manner may be required to be performed as coordinated operations in which each of the nodes 300a-d separately performs the same operations in a manner that is coordinated among the nodes such that the same changes are made to all of the copies of the client data 130 (or other data) such that all of those copies are again synchronized in the same up to date state upon completion of those operations. As part of effecting such coordination, the master node 301 may respond to the receipt of a request to perform a coordinated operation from one of the client devices 100 or one of the nodes 300a-d by replicating the request to the others of the nodes 300a-d if the master node 301 determines or has already earlier determined that there is a quorum of the nodes 300a-d available. The master node 301 may then await indications from each of the others of the nodes 300a-d as to whether or not each is able to perform the coordinated operation, and may treat each of those indications as a vote along with its own determination as to whether it is also able to perform the coordinated operation. If there is a quorum of votes among the nodes 300a-d indicating that they are able to perform the coordinated operation, then the master node 301 and the others of the nodes 300a-d may each perform the coordinated operation at least partly in parallel with each other, and/or the master node 301 may signal the client device 100 or the one of the nodes 300a-d from which the request was received that the request is accepted. However, if there isn't a quorum of the votes among the nodes 300a-d that they are able to perform the coordinated operation, then the master node 301 may signal all of the others of the nodes 300a-d that the coordinated operation is not to be performed, and/or the master node 301 may signal the client device 100 or the one of the nodes 300a-d from which the request was received that the request is rejected.

Turning to FIG. 1B, in embodiments in which there is more than one cluster 1300, it may be that the master node 301 of only one of the clusters 1300 receives requests for coordinated operations from the client devices 100. That master node 301 of that one of the clusters 1300 may then replicate the request to the master node 301 of one or more other clusters 1300 for that master node 301 to then act upon that request by determining whether there is a quorum available and/or conducting a vote to determine whether or not the request is accepted. The master node(s) 301 of the one or more other clusters 1300 may then relay the results of the determination(s) as to whether there is a quorum in each of the one or more other clusters 1300 and/or the results of the vote(s) within the one or more other clusters 1300 back to the master node 301 that originally received the request. The master node 301 that originally received the request may then use those results alongside corresponding results within its own cluster 1300 to determine ultimately whether the request will be accepted or rejected. By way of example, where there are two clusters 1300, and there is a determination that there is no quorum to perform coordinated operations in one of the clusters or there isn't a quorum of the vote among the nodes 300a-d of one of the clusters indicating that they are able to perform the coordinated operation, then the one of the master nodes 301 that originally received the request may transmit an indication to the client device 100 from which the request was received that the request has been rejected.

Returning to FIG. 1A, as also depicted in FIG. 1A, one of the nodes 300a-d may be selected to serve as a tie breaker node 302 that is assigned a weighting value "epsilon" by which its availability in a quorum and its vote is given slightly more weight than those of any of the others of the nodes 300a-d. Stated differently, both the availability of the tie breaker node 302 and the vote of the tie breaker node 302 may be counted as having an additional fractional value beyond any of the others of the nodes 300a-d (e.g., such as an additional half vote). Thus, while the tie breaker node 302 is still only a single node, its availability to participate in a quorum may count as fractionally more than a single node participating in that quorum, and the vote cast by the tie breaker node 302 may be counted as a fractionally larger vote than the single vote that all of the others of the nodes 300a-d may cast.

Comparing FIGS. 1A and 1B, in various embodiments, the master node 301 and the tie breaker node 302 may be one and the same node as depicted in FIG. 1A, or may be different nodes as depicted in FIG. 1B. It may be that one or both of the master node 301 and the tie breaker node 302 are automatically selected using different criteria. Given the role of the master node 301 in communicating with the client devices 100 via the client interconnect 199, the selection of the master node 301 may be at least partly based on the quality of service available in its network connections to one or more of the client devices 100 via the client interconnect 199 to receive such requests, and/or the quality of service available in its network connections to others of the nodes 300a-d within its cluster 1300 via the intra-cluster interconnect 599 to coordinate the voting thereamong. Given the role of the tie breaker node 302 in each vote, the selection of the tie breaker node 302 may be based on a determination of which of the nodes 300a-d is least likely to fail to the extent of becoming incapable of being available to be a member of a quorum and/or to vote within that quorum. Thus, the selection of the tie breaker node 302 may be at least partly based on how fully utilized its processing resources currently are in comparison to how fully utilized the processing resources of others of the nodes 300a-d are.

Figure 2A:
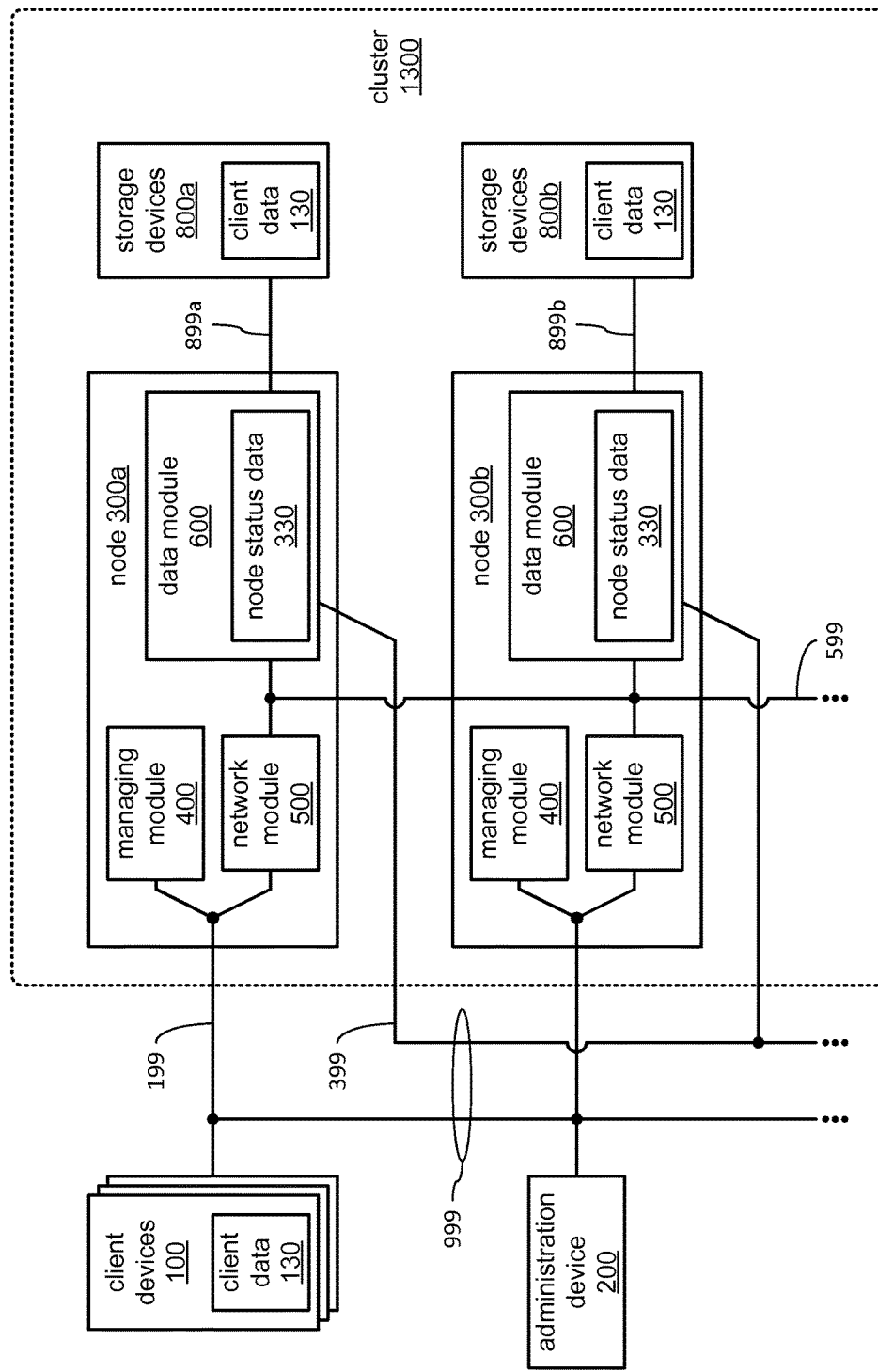
FIGS. 2A and 2B each illustrate an example embodiment of storing client data.
Figure 2B:
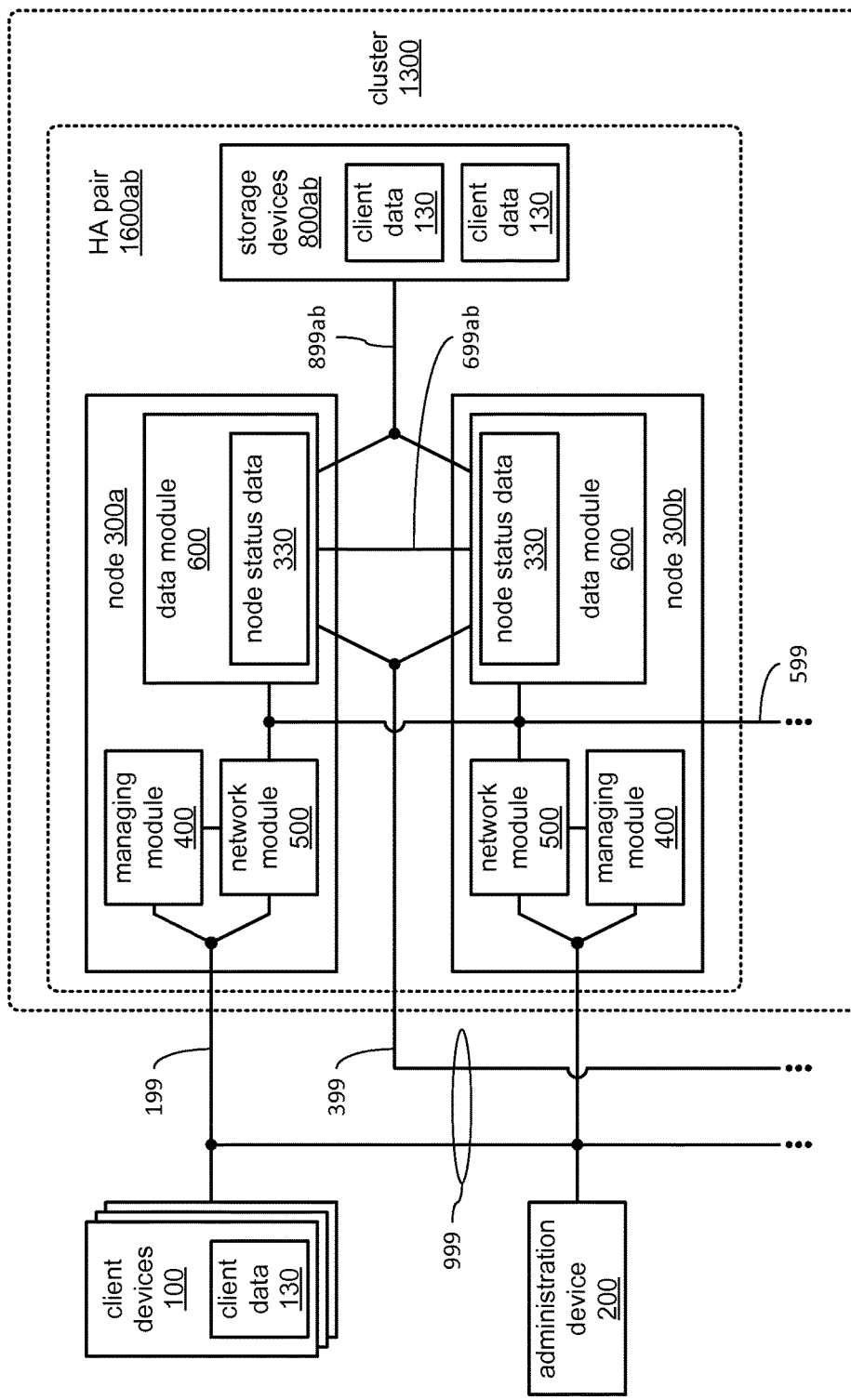

FIGS. 2A and 2B each illustrate a block diagram of an example embodiment of the manner in which copies of the client data 130 may be stored in the storage cluster system 1000. FIG. 2A depicts an example embodiment in which the storage cluster system 1000 includes a separate set of storage devices 800 for each of the nodes 300 to separately control to store a copy of the client data 130. More specifically, FIG. 2A depicts a set of storage devices 800a controlled by the node 300a to store one copy of the client data 130, and a separate set of storage devices 800b controlled by the node 300b to store another copy of the client data 130. FIG. 2B depicts an example embodiment in which the nodes 300 of a cluster 1300 may be organized into high-availability (HA) pairs 1600 in which pairs of the nodes 300 monitor each other in preparation for one to take over for the other in response to a failure therein. More specifically, FIG. 2B depicts the organization of the nodes 300a and 300b into a HA pair 1600ab in which the nodes 300a and 300b share control of a set of storage devices 800ab and in which each of the nodes 300a and 300b to store a separate copy of the client data 130 within the set of storage devices 800ab. It should be noted that despite the specific depiction in FIG. 2B of a pair of the nodes 300 being organized into a HA pair in which each monitors the other and is able to take over for the other, other embodiments are possible in which the nodes 300 may be organized into HA groups of three or more nodes 300 apiece in which any of a variety of arrangements may be made for one node to take over for another.

As depicted in FIG. 2A, each of the sets of storage devices 800*a* and 800*b* is separately coupled to one of the nodes 300*a* and 300*b* through a storage interconnect 899*a* and 899*b*, respectively. As depicted in FIG. 2B, the set of storage devices 800*ab* is coupled to both of the nodes 300*a* and 300*b* through a shared storage interconnect 899*ab*. Additionally, in FIG. 2B, the nodes 300*a* and 300*b* are additionally coupled to each other via a HA interconnect 699*ab* by which each of the nodes 300*a* and 300*b* are able to monitor the other for an indication of a failure therein. It is envisioned that each of the nodes 300 are likely to be co-located within a single chassis, rack and/or room with the set of storage devices 800 to which it is coupled such that each of the storage interconnects 899 (e.g., each of the storage interconnects 899*a*, 899*b* and 899*ab*) are likely to extend a relatively short distance. Similarly, it is envisioned that each of the nodes 300 of a HA pair 1600 are likely to be co-located within a single chassis, rack and/or room such that each of the HA interconnects 699 (e.g., the HA interconnect 699*ab*) is likely to extend a relatively short distance.

Referring to FIGS. 1A-B, as well as to FIGS. 2A-B, the network 999 and each of the interconnects 199, 399, 599 and 699 (e.g., the HA interconnect 699*ab*) may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Also, each of the storage interconnects 899 (e.g., the storage interconnects 899*a*, 899*b* and 899*ab*) may be based on any of a variety of widely known and used storage interface standards, including and not limited to, SCSI, serially-attached SCSI (SAS), Fibre Channel, etc.

Returning to FIGS. 2A and 2B, as depicted, each of the nodes 300 (e.g., the depicted nodes 300*a* and 300*b*) may incorporate a managing module 400, a network module 500 and a data module 600. As will be explained in greater detail, each of the modules 400, 500 and 600 may incorporate a separate processor component and a separate storage that stores a set of instructions for execution by its associated processor component. As also depicted, it may be the managing module 400 and the network module 500 within each node 300 that are coupled to the client interconnect 199; it may be the network module 500 and the data module 600 of each node that are coupled to an intra-cluster interconnect that extends within a cluster 1300; and it may be the data module 600 within each node 300 that is coupled to a storage interconnect 899 and to a inter-cluster interconnect 399 that extends between multiple ones of the clusters 1300. Further, it may be the data module 600 that is coupled to a HA interconnect 699 that extends to the data module 600 of the other node 300 in a HA pair.

The administration device 200 may communicate through the client interconnect 199 with the managing module 400 of one of the node 300*a-d* within one or more of the clusters 1300 of the storage cluster system 1000 as part of configuring various aspects of the operation of the nodes 300*a-d* within each of the clusters 1300 to store copies of the client data 130. By way of example, in some embodiments, an initial selection of the master node 301 and/or the tie breaker node 302 may be made by an administrator of the storage cluster system 1000 through operation of the administration device 200 in communication with one or more of the nodes 300*a-d* via the client interconnect 199. However, and as will be explained in greater detail, regardless of the manner in which initial selections of the master node 301 and tie breaker node 302 are made, the master node 301 and/or tie breaker node 302 may be automatically changed in response to various situations, including failures in one or more of the nodes 300*a-d* of the cluster 1300. In some embodiments, at least some of such automatic changes may entail a vote among the nodes 300*a-d*.

The network module 500 of the one of the nodes 300*a-d* that is assigned the role of the master node 301 such that it is in communication with the one or more client devices 100 via the client interconnect 199 may receive requests therefrom for storage services and may translate those requests into coordinated operations to be voted upon and/or performed by multiple ones of the nodes 300*a-d*. It may be that protocols and/or formats employed in conveying a request for storage services via the client interconnect 199 to one of the nodes 300*a-d* differ from those used in replicating and conveying the corresponding request for a coordinated operation among the nodes 300*a-d* via the intra-cluster interconnect 599 and/or the inter-cluster interconnect 399. Thus, the network module 500 may translate the protocols and/or formats of the request therebetween, as well as the protocols and/or formats by which a response of acceptance or rejection may be transmitted back to the requesting client device 100.

With its coupling to one of the sets of storage devices 800 (e.g., one of the sets of storage devices 800*a*, 800*b* or 800*ab*) via one of the storage interconnects 899, it may be the data module 600 within each of the nodes 300*a-d* that actually performs the coordinated operations for which requests have been accepted as a result of voting. Also, with such a coupling to one of sets of storage devices 800 such that the data module 600 within each of the nodes 300*a-d* is able to directly monitor the condition of that one of the sets of storage devices 800, it may be the data module 600 within each of the nodes 300*a-d* that determines whether performance of a requested coordinated operation is possible and then casts a vote reflecting the results of that determination. It may further be the data module 600 of each of the nodes 300*a-d* that maintains a copy of the node status data 330 made up of indications of the degree of functionality of each of the nodes 300*a-d* and/or indications of which functions are available in each of the nodes 300*a-d*, as well as indications of which of the nodes 300*a-d* is the master node 301, which of the nodes 300*a-d* is the tie breaker node 302 and/or which of the nodes 300*a-d* is available to be a member of a quorum. Like the separately stored copies of the client data 130, each of the copies of the node status data 330 may be required to be kept synchronized with the other copies such that all of the copies of the node status data 330 are required to be kept in the same state to the extent possible. Thus, any operation that is requested by one of the nodes 300*a-d* to alter the node state data may be required to be performed in a coordinated manner as a coordinated operation by all of the nodes 300*a-d* as part of maintaining all of the copies of the node state data 330 in the same synchronized and up to date state.

At recurring intervals, each of the nodes of the cluster that are able to do so may transmit a "heartbeat" signal to all of the other nodes of the cluster. In some embodiments, these intervals may be configured to be offset from one another to minimize collisions among such signals in network communications among the nodes. The fact of being capable of sending a heartbeat signal, at all, may be taken by each of the other nodes that receive it as an indication that the node that transmitted that heartbeat signal is functional to at least a minimal degree. The heartbeat signal may include further pieces of information about the degree to which the node that transmitted it is functional, and/or further pieces of information about which functions of that transmitting node are available for use. Each node that receives that heartbeat signal may update its copy of the node state data to reflect the degree and/or types of available functionality indicated in that heartbeat signal. Alternatively or additionally, if a predetermined period of time elapses from when the last heartbeat signal was received at one node from another node, then that node may update its copy of the node state data to reflect the possibility that there has been a failure in that other node. As previously discussed, such exchanges of heartbeat signals and/or other signals indicating the functionality of each of the nodes 300a-d and/or the availability of each of the nodes 300a-d to be a member of a quorum may or may not be triggered by the one of the nodes 300a-d that serves as the master node 301. Also alternatively or additionally, a node may transmit a preemptive indication that it is about to become unavailable to participate in coordinated operations and/or in voting to all of the other nodes. Each of the nodes may also update their copies of the node status data with an indication that the transmitting node is about to become so unavailable. As will be explained in greater detail, at least some of such updates to the copies of the node status data may be conditioned on various interlocks coordinating activity among the nodes and/or may be performed as coordinated operations conditioned on the outcome of a vote among the nodes.

Figure 3:
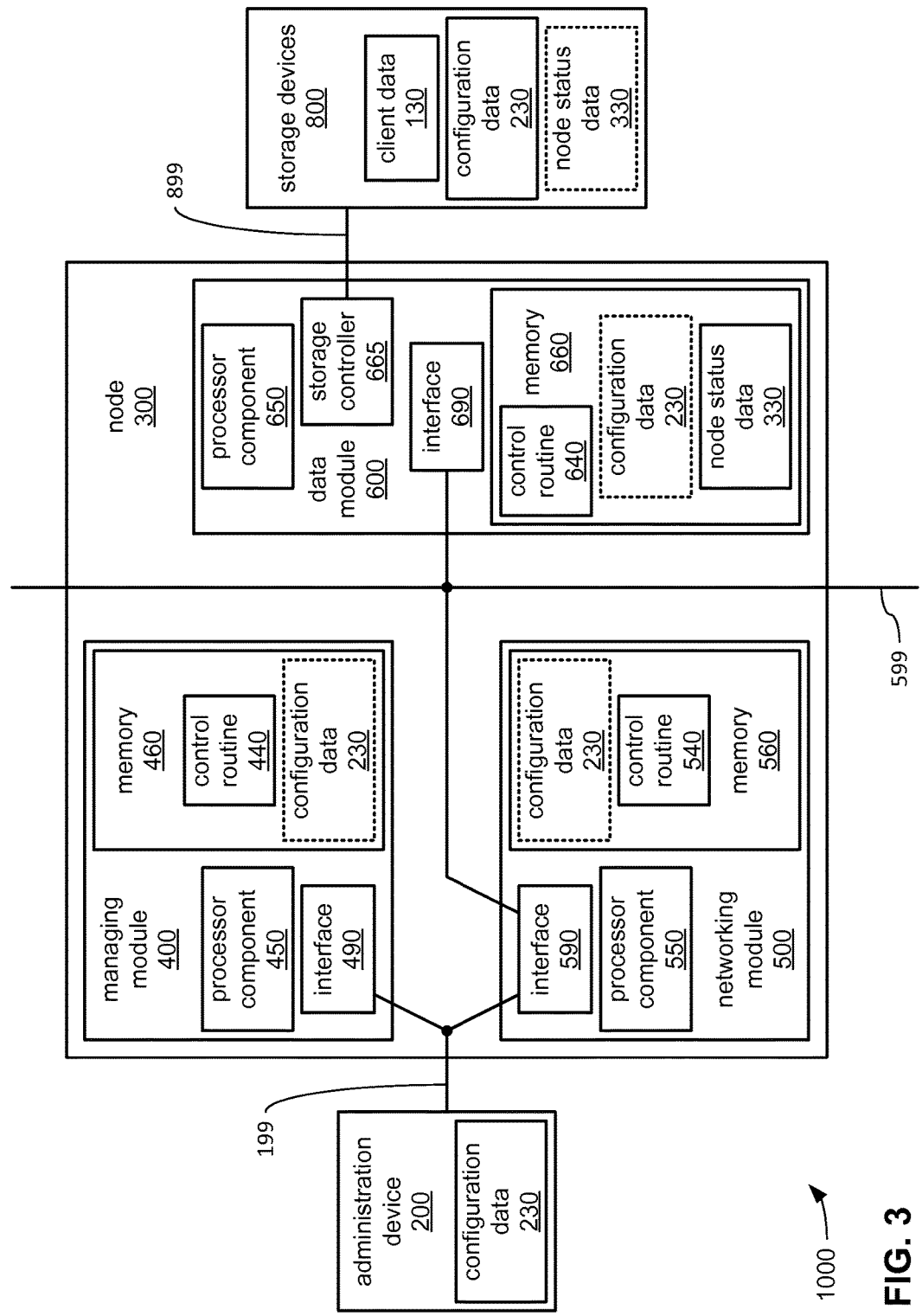
FIG. 3 illustrates an example embodiment of configuring a storage cluster system for use.

FIG. 3 illustrates a block diagram of an example embodiment of a node 300 that depicts various aspects of each of the managing module 400, the network module 500 and the data module 600 in more detail. More specifically, FIG. 3 depicts aspects of the configuration of one or more of the nodes 300a-d of one of the clusters 1300. Again, each of the earlier depicted nodes 300a-d are instances of the node 300, such that what is depicted in and is discussed in reference to FIG. 3 may be applicable to each of the earlier depicted nodes 300a-d.

In various embodiments, the managing module 400 of each of the nodes 300a-d may incorporate one or more of a processor component 450, a memory 460 and an interface 490 to couple the managing module 400 to at least the client interconnect 199. The memory 460 may store a control routine 440 and/or configuration data 230. The control routine 440 may incorporate a sequence of instructions operative on the processor component 450 in its role as a main processor component of the managing module 400 to implement logic to perform various functions.

In executing the control routine 440, the processor component 450 of the managing module 400 may operate the interface 490 to accept the configuration data 230. In some embodiments, the configuration data 230 may be provided thereto by the administration device 200 via the client interconnect 199, as depicted, or via a direct point-to-point interconnect (not shown) between the administration device and the managing module 400. In other embodiments, the configuration data 230 may be provided by one of the client devices 100 via the client interconnect 199. In some embodiments, the processor component 450 may provide a web server, telnet access, instant messaging and/or other communications service(s) by which the configuration data 230 may be so provided to the managing module 400 via the client interconnect 199. Regardless of the exact manner in which the configuration data 230 is provided, as the processor component 450 may then relay at least portions of the configuration data 230 to the network module 500 and/or the data module 600. In various embodiments, the configuration data 230 may be propagated by the administration device 200 and/or the managing module 400 to one or more of the others of the nodes 300a-d.

In various embodiments, the network module 500 of each of the nodes 300a-d may incorporate one or more of a processor component 550, a memory 560 and an interface 590 to couple the network module 500 to one or both of the client interconnect 199 and an intra-cluster interconnect 599 extending among the nodes 300a-d within one of the clusters 1300. The memory 560 may store a control routine 540 and/or at least a portion of the configuration data 230 provided to the network module 500 by the managing module 400. The control routine 540 may incorporate a sequence of instructions operative on the processor component 550 in its role as a main processor component of the Network module 500 to implement logic to perform various functions.

In executing the control routine 540, the processor component 550 of the network module 500 may configure aspects of the operation of the interface 590 in accordance with network addresses and/or other information conveyed in the configuration data 230 to prepare to be the active one of the network modules 500 operating with the one of the nodes 300a-d that has been selected to be the master node 301. Such preparation may include testing communications with one or more client devices 100 via the client interconnect 199 and/or testing communications with one or more of the others of the nodes 300a-d via the intra-cluster interconnect 599. Such tests may reveal a need to update some of the information in the configuration data 230, such as instances in which there has been a change to a network address of a client device and/or another one of the nodes 300a-d on the client interconnect 199 and/or the intra-cluster interconnect 599. The processor component 550 may relay indications of such updates back to the managing module 400 and/or to the data module 600.

In various embodiments, the data module 600 of each of the nodes 300a-d may incorporate one or more of a processor component 650, a memory 660, a storage controller 665 to couple the data module 600 to a set of storage devices 800 (e.g., the set of storage devices 800a, 800b or 800ab) via a storage interconnect 899 (e.g., one of the storage interconnects 899a, 899b or 899ab), and an interface 690 to couple the data module 600 to one or more of a intra-cluster interconnect 599, the inter-cluster interconnect 399 and a HA interconnect 699 (e.g., the HA interconnect 699ab). The memory 660 stores one or more of a control routine 640, at least a portion of the configuration data 230 and a copy of the node status data 330. The control routine 640 incorporates a sequence of instructions operative on the processor component 650 in its role as a main processor component of the data module 600 to implement logic to perform various functions.

In executing the control routine 640, the processor component 650 of the data module 600 generate an initial version of the node status data 330 from the configuration data 230 and/or any updates thereto received from the managing module 400 and/or the network module 500. The processor component 650 may operate the storage controller 665 to store the configuration data 230 and/or the copy of the status data 330 within a set of storage devices 800 (e.g., the set of storage devices 800a, 800b or 800ab) coupled to the data module 600 for later retrieval during a subsequent rebooting of at least the data module 600 and/or the one of the nodes 300a-d into which it is incorporated.

Figure 4A:
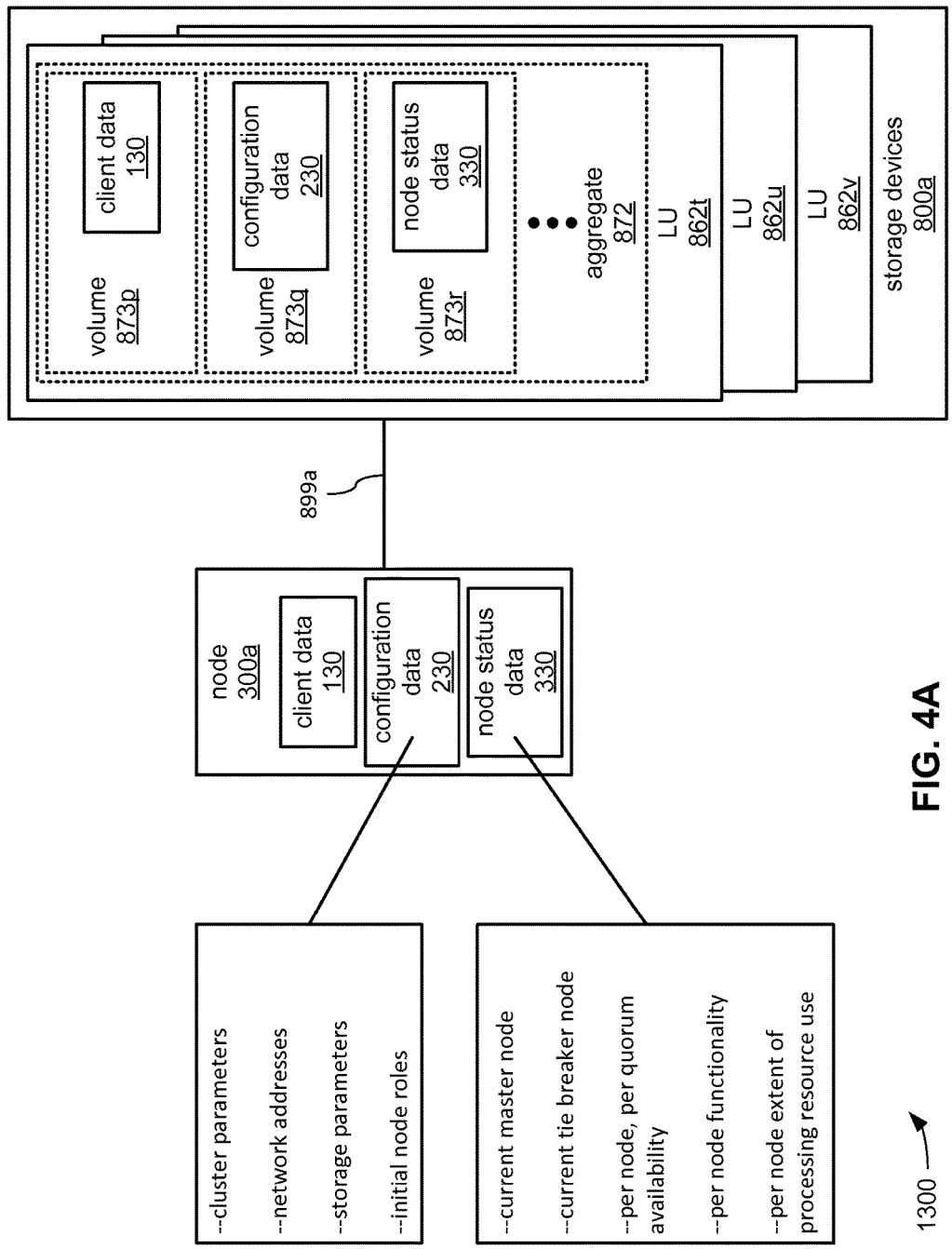
FIGS. 4A and 4B each illustrate an example embodiment of organizing data within storage devices of a storage cluster system.
Figure 4B:
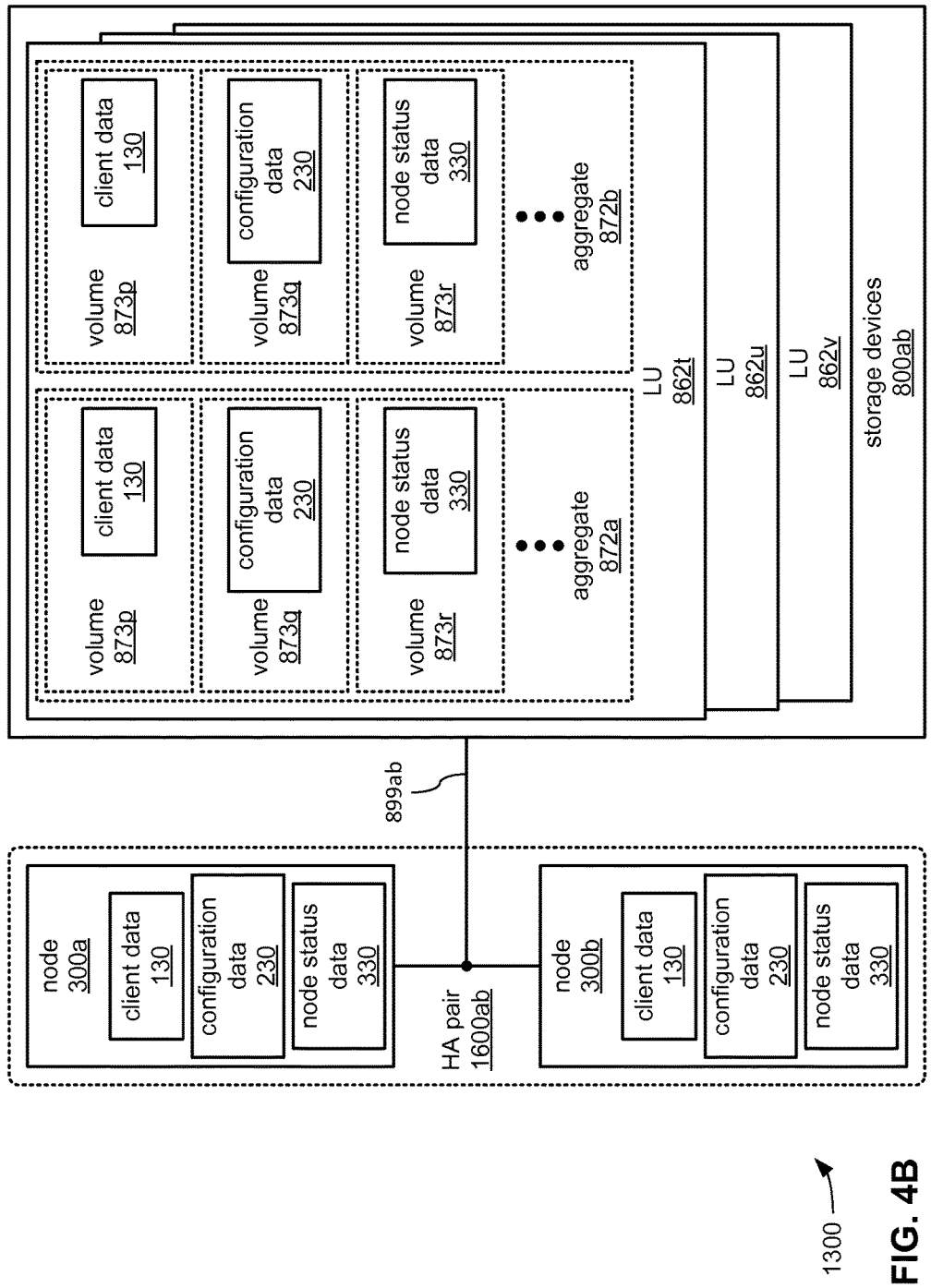

FIGS. 4A and 4B each illustrate a block diagram of an example embodiment of the manner in which copies of data may be stored within at least one of the sets of storage devices 800 within one of the clusters 1300. FIG. 4A depicts an example embodiment in which a cluster 1300 includes a separate set of storage devices 800 for each of the nodes 300 in greater detail. More specifically, FIG. 4A depicts aspects of the storage of a copy of the client data 130, the configuration data 230 and/or the node status data 330 within the set of storage devices 800a by the node 300a. FIG. 4A also depicts aspects of the contents of the configuration data 230 and the node status data 330. FIG. 4B depicts an example embodiment in which the nodes 300 of a cluster 1300 may be organized into HA pairs 1600 that share a set of storage devices 800 in greater detail. More specifically, FIG. 4B depicts aspects of the storage of side-by-side pairs of copies of the client data 130, the configuration data 230 and/or the node status data 330 within the set of storage devices 800ab by the nodes 300a and 300b of the HA pair 1600ab.

Turning to FIG. 4A, each of the sets of storage devices 800, such as the depicted set of storage devices 800a coupled to the node 300a, may be made up of storage devices based on any of a variety of storage technologies, including and not limited to, ferromagnetic "hard" or "floppy" drives, magneto-optical media drives, optical media drives, non-volatile solid state drives, etc. Further, and as depicted, the set of storage devices 800a may include multiple logical units (LUs) 862t-v that may be operated together to form an array of storage devices. In some embodiments, the processor component 650 of the data module 600 of the node 300a may operate the storage controller 665 to treat each of the storage devices of the set of storage devices 800a as a separate LU and/or may be caused to treat a group of those storage devices together as a single LU. Multiple LUs may be operated together to implement a level of RAID or other form of array that imparts fault tolerance in the storage of data therein.

The processor component 650 of the data module 600 may be caused to allocate storage space in any of a variety of ways within a single LU and/or within multiple LUs operated together to form an array, and/or may be caused to subdivide storage space in any of a variety of ways within a single LU and/or within multiple LUs that are operated together. By way of example, such subdivisions may be effected as part of organizing the client data 130 into separate categories based on subject, as part of separating client data 130 into different versions generated over time, as part of implementing differing access policies to different pieces of client data 130, etc. In some embodiments, and as depicted, the storage space provided within the LU 862t or within a combination of the LUs 862t-v may be designated as an aggregate 872. Further, the aggregate 872 may be subdivided into volumes 873p-r. The manner in which aggregates and/or volumes are defined may be selected to conform to the specification(s) of one or more widely known and used file systems, including and not limited to, Write Anywhere File Layout (WAFL).

The client data 130 may be stored entirely within one of the volumes 873p-r (as depicted), or may be distributed among multiple ones of the volumes 873p-r. As also depicted, the configuration data 230 and/or the node status data 330 may be stored within the same aggregate 872 as the client data 130. More specifically, the configuration data 230 and/or the node status data 330 may be stored within different volumes from the client data 130 (as depicted) or within the same volume as at least a portion of the client data 130.

As also depicted in FIG. 4A, the configuration data 230 may specify various aspects of the operation of the storage cluster system 1000. Among the specified aspects may be cluster parameters specifying the quantity of clusters 1300 within the storage cluster system 1000, the quantity of nodes within each of the clusters 1300, and/or whether the nodes within each of the clusters 1300 are organized into HA pairs 1600. Also among the specified aspects may be network addresses at which at least various ones of the nodes 300 may be accessible on the client interconnect 199, the inter-cluster interconnect 399, the intra-cluster interconnect 599, any instances of a HA interconnect 699, etc. Further among the specified aspects may be storage parameters for the operation of each set of storage devices 800 within one of the clusters 1300, such as whether individual storage devices or multiple storage devices are treated as a single LU, what RAID level may be implemented by an array of storage devices, what file system(s) to use, what aggregates and/or volumes are to be defined, and/or which aggregates and/or volumes are to store which ones of the client data 130, the configuration data 230 and/or the node status data 330.

As further depicted in FIG. 4A, the node status data 330 may store indications of various aspects of the status of each of nodes 300 within one of the clusters 1300. By way of example, within one of the earlier depicted clusters 1300 made up of the nodes 300a-d, the indicated aspects may include which one of the nodes 300a-d is currently assigned the role of the master node 301 and which one of the nodes 300a-d is currently assigned the role of the tie breaker node 302. The indicated aspects may also include an indication of the degree to which each of the nodes 300a-d is currently functional and/or what functions are currently available within each of the nodes 300a-d. The indicated aspects may further include the extent to which the processing resources within each of the nodes 300a-d are currently being used such that each of the nodes 300a-d may or may not be able to perform one or more additional tasks.

The indicated aspects included within the node status data 330 may still further include which ones of the nodes 300a-d are available to be a member of a quorum. As previously discussed, there may be multiple side-by-side quorums in which each of the nodes 300a-d may be a participant within the same cluster 1300. Each of those quorums may be associated with a different type of coordinated operation and/or with a different type of data on which a coordinated operation may be performed. Thus, the indications of availability of each of the nodes 300a-d to be a member of a quorum may include indications of availability of each of the nodes 300a-d to be a member of each of multiple quorums. It should be noted that, despite the depiction of the single data structure of the node status data 330 that includes all of such indications within each of the nodes 300a-d, other embodiments are possible in which multiple separate data structures are employed within each of the nodes 300a-d. By way of example, the indications of which nodes are currently the master node 301 and the tie breaker node 302 may be maintained in one data structure within each of the nodes 300a-d, while indications of the current per quorum availability of each of the nodes 300a-d may be maintained within each of the nodes in a separate data structure. Still other arrangements of data structures and/or combinations of data structures may occur to those skilled in the art.

Figure 5:
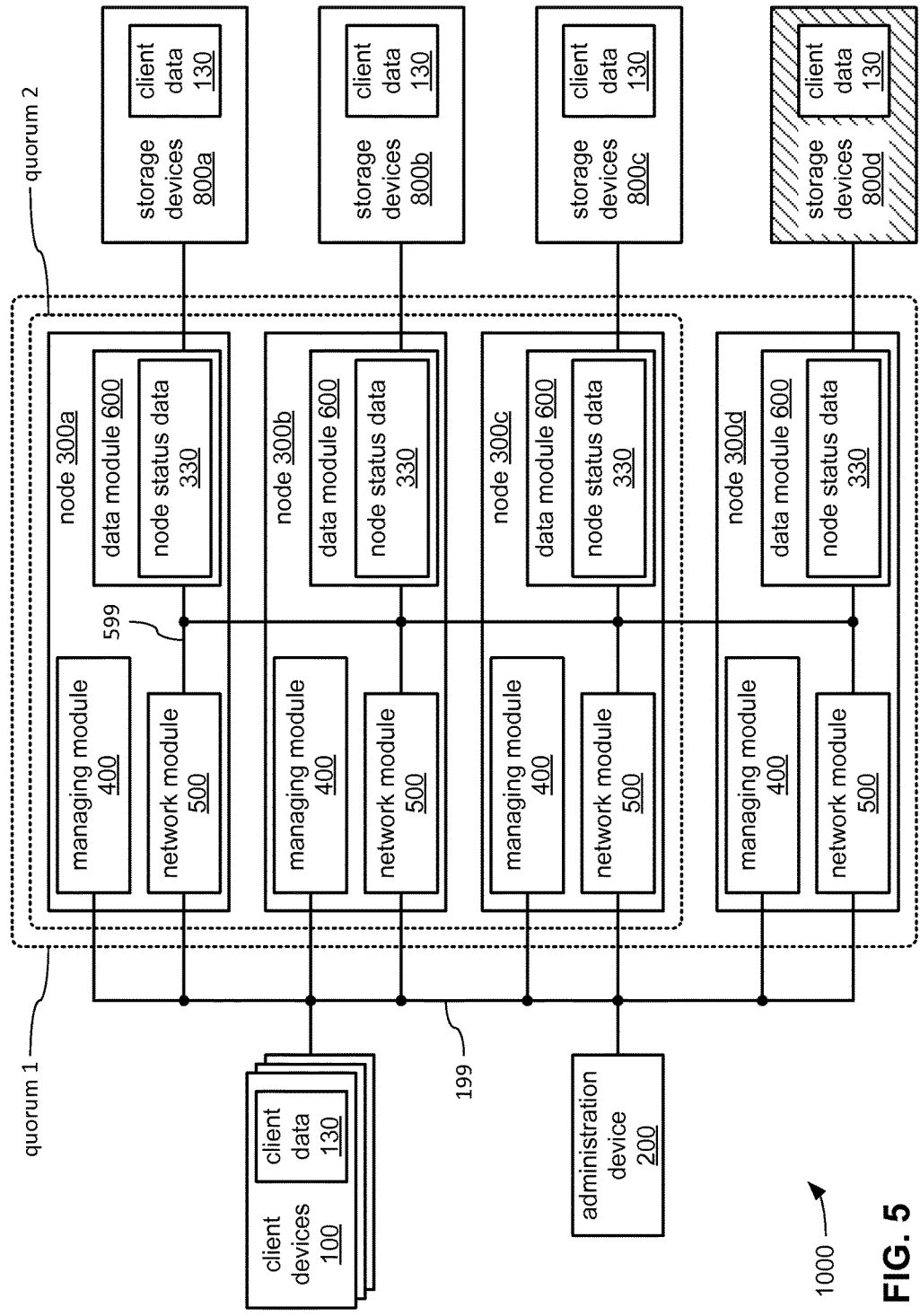
FIG. 5 illustrates an example embodiment of differences in quorums for voting among nodes.

FIG. 5 illustrates a block diagram of an example in which different ones of the nodes 300a-d in one of the clusters 1300 may be available to be a member of two different quorums. As depicted, a failure or other situation exists that renders the copy of the client data 130 stored within the set of storage devices 800d inaccessible for at least some coordinated operations. However, the node 300d, which is the one of the nodes 300a-d to which the set of storage devices 800d is coupled, is functioning normally such that the copy of the node status data 330 maintained within the data module 600 of the node 300d, itself, remains accessible. Thus, for an embodiment in which there is a quorum 1 associated with the copies of the node status data 330 maintained internally by each of the nodes 300a-d and in which there is a quorum 2 associated with the copies of the client data 130 maintained within corresponding ones of the sets of storage devices 800a-d, the node 300d may remain available to be a member of quorum 1 associated with coordinated operations affecting the copies of the node status data 330, but may cease to be available to be a member of quorum 2 associated with coordinated operations affecting the copies of the client data 130.

Returning from FIG. 5, FIG. 4B depicts a similar configuration of the LUs 862t-v as depicted in FIG. 4A. However, the LUs 862t-v are incorporated into the depicted set of storage device 800ab that is shared between the nodes 300a and 300b via the shared storage interconnect 899ab. As also depicted, the set of storage devices 800ab stores a pair of similar aggregates 872a and 872b that each mirror the aggregate 872 of FIG. 4A in their content. During normal operation in which both of the nodes 300a and 300b are functional to perform operations on data stored within the set of storage devices 800ab, the node 300a may store and modify the data within the aggregate 872a separately and independently from the storage and modification of the data within the aggregate 872b by the node 300b. However, if one of the nodes 300a-b fails, the still functioning one of the nodes 300a-b may take over the performance of storage and/or modifications to the data within the one of the aggregates 872a or 872b associated with the failing one of the nodes 300a-b. In essence, the still functioning one of the nodes 300a-b would perform each operation affecting such data twice—once within the aggregate 872a and then again within the aggregate 872b.

In some embodiments, such doubling of the performance of each operation (once within the aggregate 872a and then again within the aggregate 872b) may encompass operations affecting both of the copies of the node status data 330 and/or both of the copies of the configuration data 230, as well as both of the copies of the client data 130. However, in other embodiments, such doubling of the performance of each operation may include only operations affecting both of the copies of the client data 130. In such other embodiments, the copy of the node status data 330 and/or the copy of the configuration data 230 normally associated with the one of the nodes 300a-b that has failed may be allowed to remain unchanged until the failing one of the nodes 300a-b is again in normally operating condition such that it is able to request and/or be provided with updated versions of the node status data 330 and/or of the configuration data 230 by another of the nodes 300a-d. It may be that the master node 301 detects the return of the previously failing one of the nodes 300a-b to normal operating condition, and preemptively provides that previously failing one of the nodes 300a-b with copies of the node status data 330 and/or of the configuration data 230, or it may be that the previously failing one of the nodes 300a-b requests one or both of those copies from the master node 301. Alternatively, it may be the partner of the previously failing one of the nodes 300a-b that so provides those copies, either preemptively or in response to a request to do so.

Figure 6A:
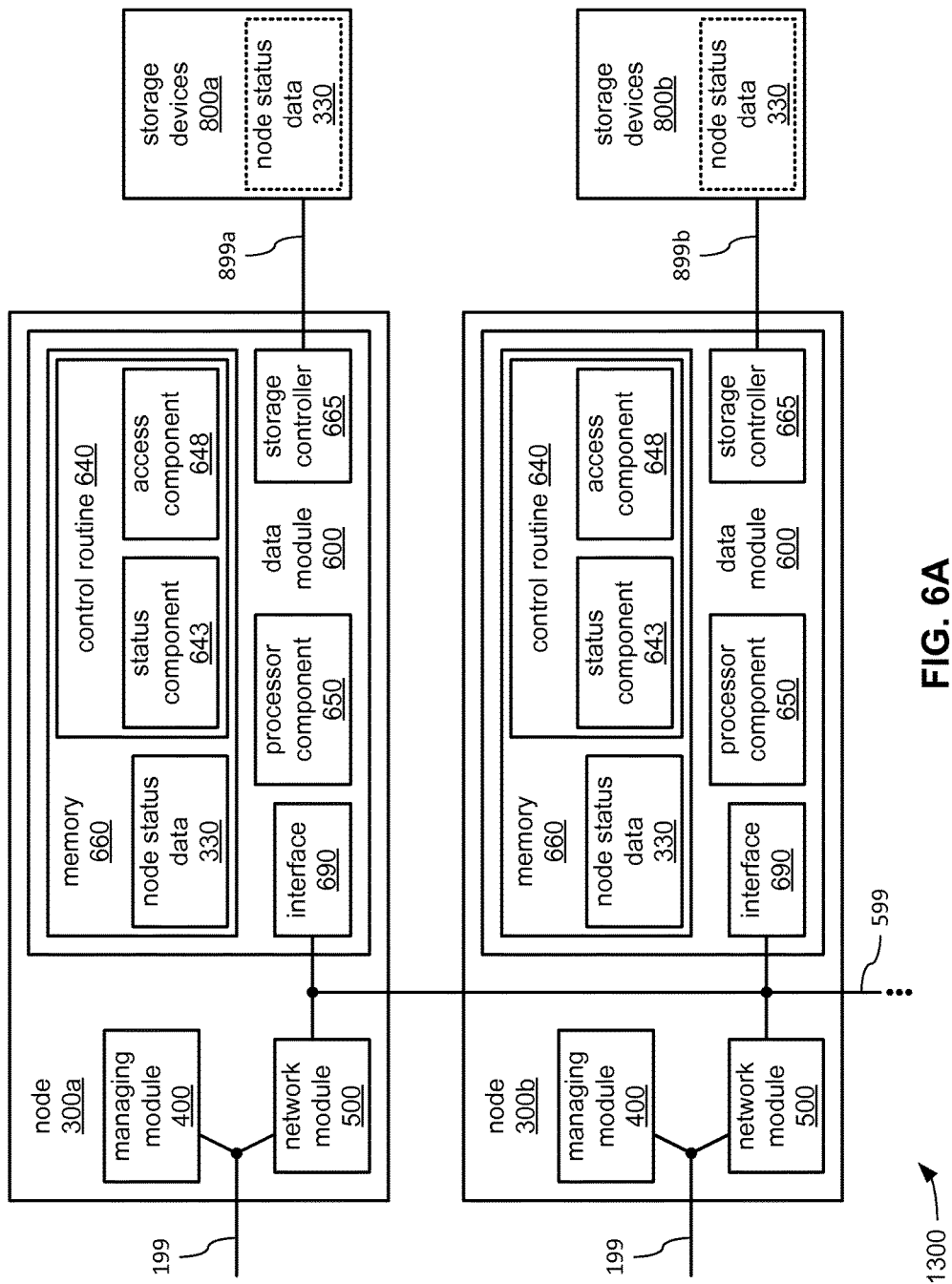
FIGS. 6A and 6B each illustrate an example embodiment of monitoring and recording the status of nodes of a storage cluster system.
Figure 6B:
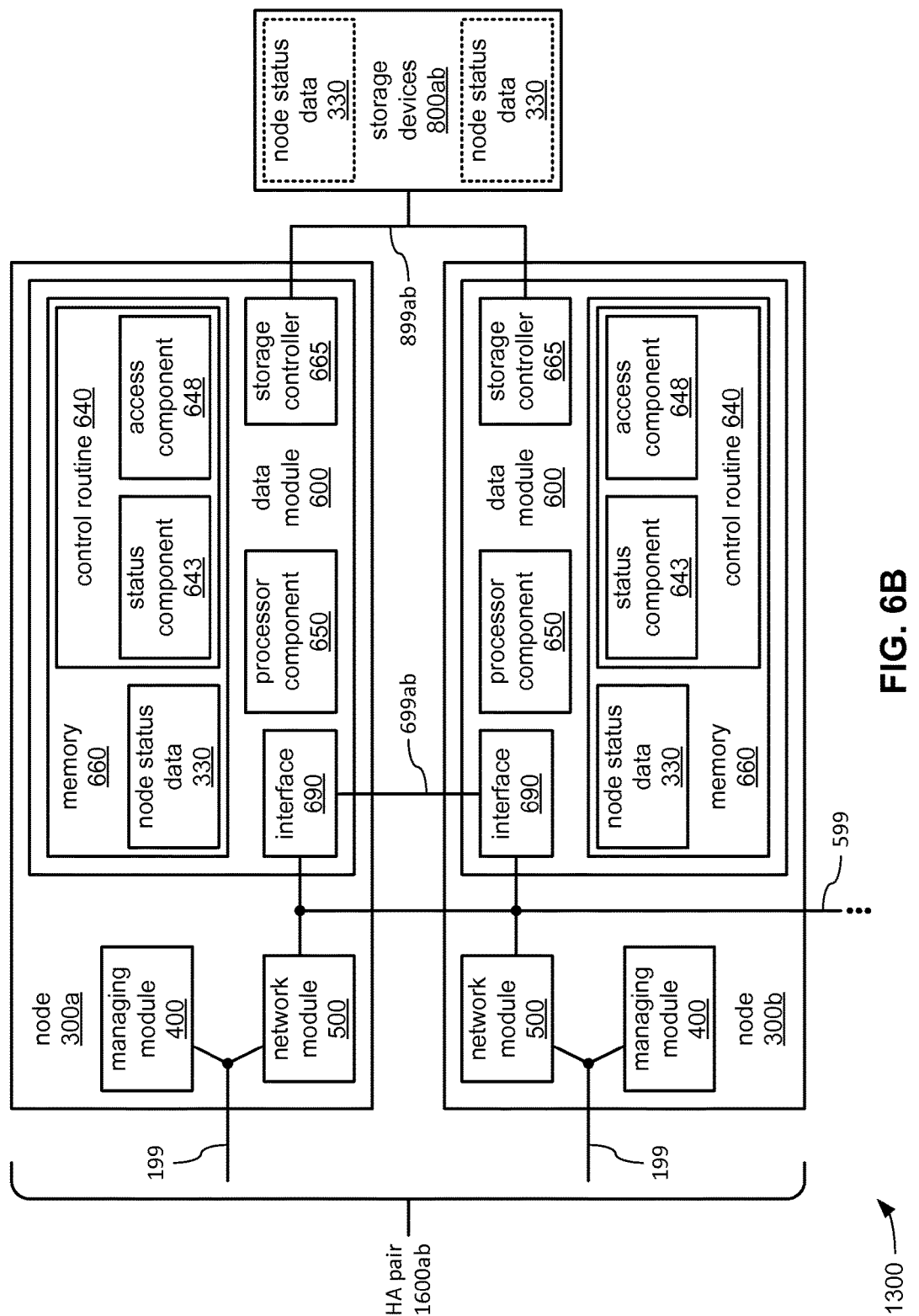

FIGS. 6A and 6B each illustrate a block diagram of a portion of an embodiment of the storage cluster system 1000 in greater detail. More specifically, FIG. 6A depicts aspects of receiving status indications from multiple ones of the nodes 300a-d and updating the node status data 330 to reflect those indications in an embodiment of the storage cluster system 1000 in which the each of the nodes 300a-d is separately coupled to a separate corresponding one of the storage devices 800a-d as depicted in FIG. 2A. FIG. 6B depicts aspects of receiving status indications from multiple ones of the nodes 300a-d and updating the node status data 330 to reflect those indications in an embodiment of the storage cluster system 1000 in which the nodes 300a-d are organized into HA pairs 1600 (e.g., HA pair 1600ab) as depicted in FIG. 2B.

Turning to FIG. 6A, as depicted, the control routine 640 of the data module 600 of each of the nodes 300a-d may incorporate a status component 643 and/or an access component 648. In executing the control routine 640, the processor component 650 of the data module 600 of each of the nodes 300a-d may execute one or both of these components 643 and 648. Alternatively, one or both of these components 643 and 648 may be implemented with hardware-based logic (e.g., implemented with gate-level logic in a programmable logic device, transistor logic, etc.).

The status component 643 within each of the nodes 300a-d may exchange indications of node status with the status component 643 within each of the others of the nodes 300a-d on a recurring basis, either directly or through the one of the nodes 300a-d that serves as the master node 301. More precisely, the status component 643 of one of the nodes 300a-d may transmit indications of the status of that one of the nodes 300a-d to each of the others of the nodes 300a-d on a recurring basis, and may receive indications of the status of each of the others of the nodes 300a-d also on a recurring basis. In some embodiments, intervals at which such transmissions by the status component 643 of each of the nodes 300a-d occur may be staggered in time to at least reduce occurrences of collisions in the transmissions of such status by each of the status components 643 to each of the others, and such staggering in time may be coordinated by the one of the nodes 300a-d that serves as the master node 301.

The status information that is conveyed in each such transmission may include indications of the degree to which one of the nodes 300a-d is functional and/or which functions are available within that one of the nodes 300a-d, the degree of utilization of processing resources within that one of the nodes 300a-d, and/or availability of that one of the nodes 300a-d to be a member in each of one or more quorums that may be defined with a cluster 1300. The status component 643 within each of the nodes 300a-d may update the copy of the node status data 330 maintained within its one of the nodes 300a-d with any changes in status in any of the others of the nodes 300a-d that are indicated within any of the transmissions received therefrom, either directly or through the one of the nodes 300a-d that serves as the master node 301. Among such indications that may be so updated may be indications of which quorums each of the nodes 300a-d are available to be a member of.

Beyond the content of each such transmission, the fact of each occurrence of a transmission of such status may be employed as a type of "heartbeat" signal in which the status component 643 within each of the nodes 300a-d may expect to receive a transmission of indications of status from each of the others of the nodes 300a-d on a regular basis. Each occurrence of such a transmission being received from another of the nodes 300a-d within the period of time in which it is expected to be received may be taken as an indication that the transmitting one of the nodes 300a-d is functional to at least some minimum degree, while the failure to receive such a transmission from another of the nodes 300a-d when expected (e.g., within a recurring period of time) may be taken as an indication of a failure having occurred within that one of the nodes 300a-d. In response to such a determination of failure, the status component 643 may update its associated copy of the node status data 330 with an indication of that determination and/or with an indication that the one of the nodes 300a-d from which a transmission of status was not received when expected is not available to participate in voting in any quorum.

As the copies of the node status data 330 maintained by each of the nodes 300a-d are so updated by the status component 643, the access component 648 may store the copy of the node status data 330 of its one of the nodes 300a-d within a corresponding one of the set of storage devices 800a-d. In this way, if that one of the nodes 300a-d is reinitialized, the access component 648 may retrieve a relatively recent version of the copy of the node status data 330 associated with that one of the nodes 300a-d, which may aid in shortening the amount of time required for that one of the nodes 300a-d to complete reinitialization.

Turning to FIG. 6B, as depicted, the nodes 300a-d have been organized into HA pairs 1600, including the depicted HA pair 1600ab made up of the nodes 300a and 300b. Within the HA pair 1600ab, the status component 643 within each of the nodes 300a-b may also receive indications of status of the other of the nodes 300a-b via the HA interconnect 699ab that extends therebetween. As part of each of the nodes 300a and 300b remaining ready to take over for the other, the rate at which indications of the status of each of the nodes 300a and 300b are exchanged through the HA interconnect 699ab may be considerably higher than the rate at which such information is exchanged between any of the nodes 300a-d via the intra-cluster interconnect 599. Unlike the intra-cluster interconnect 599 that extends among all of the nodes 300a-d of a cluster 1300, each HA interconnect 699 (including the HA interconnect 699ab) may be a point-to-point linkage that extends only between the two nodes 300a and 300b to prevent interruptions in the exchange of information due to competition for use of an interconnect from other devices beyond the two nodes 300a and 300b. Thus, the node 300a may receive similar status information from node 300b via each of the interconnects 599 and 699ab, but may receive that similar status information significantly sooner through the interconnect 699ab.

Figure 7:
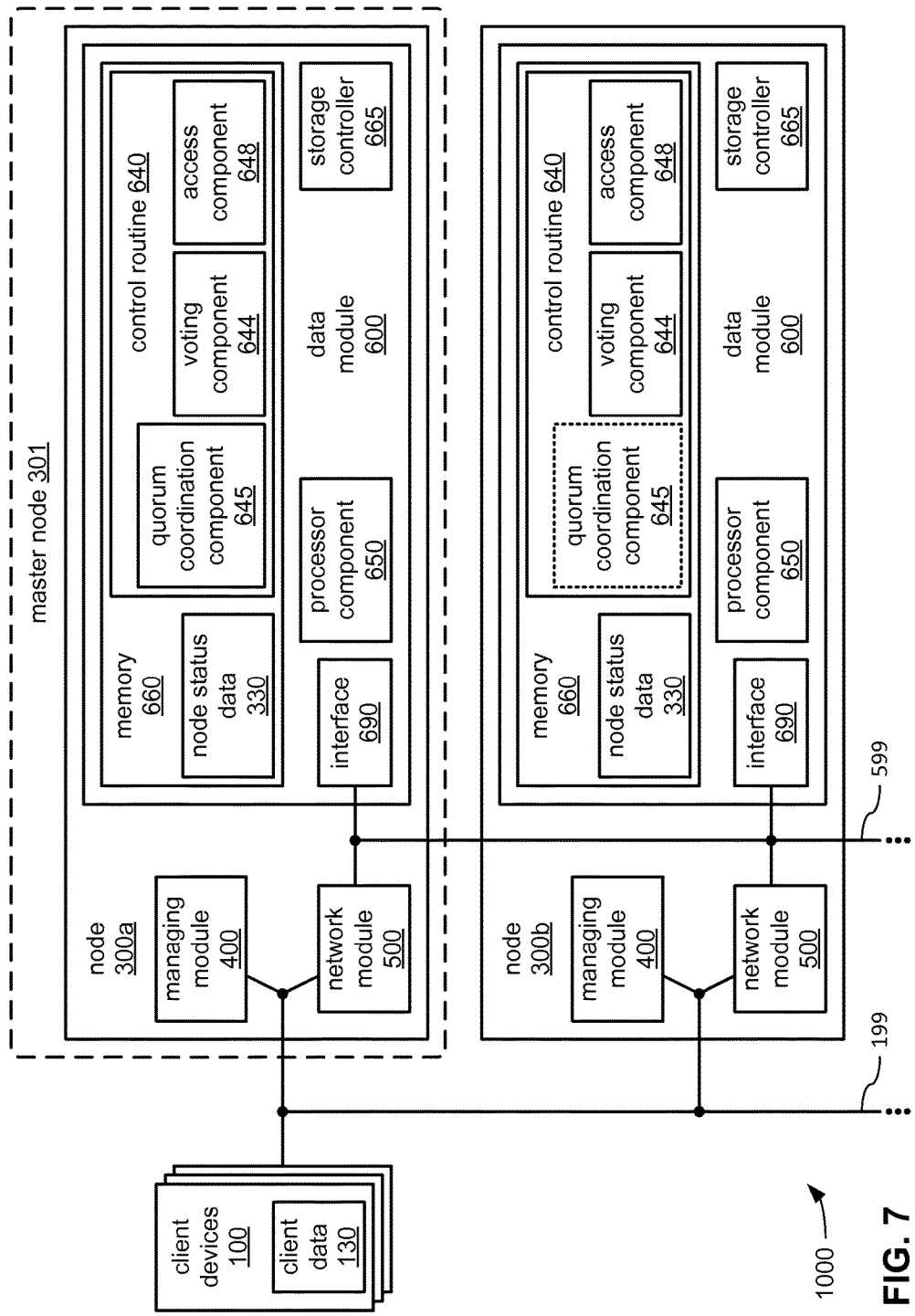
FIG. 7 illustrates an example embodiment of voting among nodes of a storage cluster system.

FIG. 7 illustrates a block diagram of a portion of an embodiment of the storage cluster system 1000 in greater detail. More specifically, FIG. 7 depicts aspects of coordinating and participating in a vote among the nodes 300a-d to determine whether to accept or reject a request to perform a coordinated operation. As depicted, the control routine 640 of the data module 600 of each of the nodes 300a-d may incorporate a voting component 644, a quorum coordination component 645 and/or the access component 648. In executing the control routine 640, the processor component 650 of the data module 600 of each of the nodes 300a-d may execute one or more of these components 644, 645 and 648. Alternatively, one or more of these components 644, 645 and 648 may be implemented with hardware-based logic. However, as depicted, with the node 300a serving in the role of the master node 301, the quorum coordination component 645 may be executed within (or be otherwise active within) the node 300a, but not within the others of the nodes 300a-d.

As has been discussed, the master node 301 may serve as the recipient of requests to perform coordinated operations from either one of the client devices 100 or from one of the others of the nodes 300a-d. A request received from one of the client devices 100 may be received by the network module 500 of the master node 301 as a request for storage services that may employ protocols and/or formats in being conveyed via the client interconnect 199 that differ from those used in replicating and conveying the corresponding request for a coordinated operation among the nodes 300a-d via the intra-cluster interconnect 599 and/or the inter-cluster interconnect 399. By way of example, the client devices 100 and the network module 500 of the master node 301 may interact with each other via the client interconnect 199 in accordance with a client/server model for the handling of the client data 130, while the nodes 300a-d and/or the network modules 500 and the data modules 600 may employ a different model in communications thereamong via the intra-cluster interconnect 599. Thus, the network module 500 may translate the protocols and/or formats between requests for storage services and corresponding requests for coordinated operations therebetween, as well as the protocols and/or formats by which a response of acceptance or rejection may be transmitted back to the requesting client device 100. In performing such translations, the network module 500 may exchange packets over both the client interconnect 199 and the intra-cluster interconnect 599. The packets exchanged via the client interconnect 199 may utilize any of a variety of file-based access protocols, including and not limited to, Common Internet File System (CIFS) protocol or Network File System (NFS) protocol, over TCP/IP. Alternatively or additionally, the exchanged packets may utilize any of a variety of block-based access protocols, including and not limited to, Small Computer Systems Interface (SCSI) protocol encapsulated over TCP (iSCSI) and/or SCSI encapsulated over Fibre Channel (FCP).

Regardless of the source, upon receiving a request to perform a coordinated operation, the quorum coordination component 645 within the master node 301 (specifically, the node 300a, as depicted) may first determine which particular quorum is associated with the requested coordinated operation in embodiments in which there is more than one quorum maintained within the cluster 1300 among the nodes 300a-d. The quorum coordination component 645 may then refer to its copy of the node status data 330 to determine whether there is currently enough of the nodes 300a-d of the cluster 1300 that are available to form that particular quorum to perform the coordinated operation. Again, whether or not there are enough of the nodes 300a-d to be members of each of the multiple quorums may be recurringly checked by the master node 301 (e.g., at a regular interval) and/or may be checked by the master node 301 in response to the receipt of a request to perform a coordinated operation, and may be triggered by the quorum coordination component 645 within the master node 301 (specifically, the node 300a, as depicted). Thus, in such embodiments, the quorum coordination component 645 may determine that the coordinated operation is not to be performed if there isn't a sufficient quantity of the nodes 300a-d available to be members of (and thereby form) that particular quorum, and instead, may transmit a response indicating that the request is rejected to the one of the nodes 300a-d that made the request, and/or to the network module 500 to translate and/or relay to the client device 100 that made the request.

However, if there is a sufficient quantity of the nodes 300a-d available to form that particular quorum for participating in a vote, then the quorum coordination component 645 within the master node 301 (specifically, the node 300a, as depicted) may replicate the request to the others of the nodes 300a-d of the cluster 1300 (e.g., may transmit a command to perform the coordinated operation to each of the others of the nodes 300a-d). Either in replicating the request to the others of the nodes 300a-d or by transmitting still another signal thereto, the quorum coordination component 645 may trigger a vote among the nodes 300a-d to determine whether the request to perform the coordinated operation will be accepted or rejected. Again, as part of that voting, the quorum coordination component 645 within the master node 301 may then await receipt of the votes from each of the nodes 300a-d, where each of those votes is an indication provided by one of the nodes 300a-d as to whether it is able to perform the coordinated operation.

Within each of the nodes 300a-d, the voting component 644 may respond to the triggering of the vote by determining whether the requested coordinated action is able to be performed by its associated one of the nodes 300a-d. Where the requested coordinated operation entails accessing the client data 130 (or other data) stored on a set of storage devices 800 associated with that node, the voting component 644 may request an indication from the access component 648 as to whether the required access to the client data 130 (or the other data) is currently available. Within each of the nodes 300a-d, it may be the access component 648 that controls the storage controller 665 to effect all accesses made to a set of storage devices 800 to store, retrieve and/or otherwise modify data stored therein. Thus, the access component 648 may monitor the degree to which access to that data is available, and may provide an indication of that accessibility to the voting component 644. The voting component 644 of each of the others of the nodes 300a-d may then transmit its vote back to the quorum coordination component 645 within the one of the nodes 300a-d serving as the master node 301. It should be noted that the voting component 644 within the master node 301 may also provide the quorum coordination component 645 therein with a vote as to whether the master node 301, itself, is able to perform the coordinated operation.

Upon receiving the votes, the quorum coordination component 645 within the master node 301 (specifically, the node 300a, as depicted) may refer to its copy of the node status data 330 to determine which of the nodes 300a-d is assigned the role of the tie breaker node 302 for that particular quorum, and may apply the added weighting value epsilon value to the vote cast by the tie breaker node 302 if a vote from the tie breaker node 302 is included among the votes that have been cast. Then, the quorum coordination component 645 may analyze the votes to determine the result. If there is a quorum of the nodes 300a-d indicating that they are able to perform the coordinated operation, then the quorum coordination component 645 may transmit a response indicating that the request is accepted to the one of the nodes 300a-d that made the request, and/or to the network module 500 to translate and/or relay to the client device 100 that made the request. Also, in some embodiments, the quorum coordination component 645 may signal the others of the nodes 300a-d with an indication that the coordinated operation is to be performed, thereby triggering the access components 648 of those others of the nodes that are able to perform the coordinated operation to do so. However, if there isn't a quorum of the nodes 300a-d indicating that they are able to perform the coordinated operation, then the quorum coordination component 645 may transmit a response indicating that the request is rejected to the one of the nodes 300a-d that made the request, and/or to the network module 500 to translate and/or relay to the client device 100 that made the request. Also, the quorum coordination component 645 may signal the others of the nodes 300a-d with an indication that the coordinated operation is not to be performed and/or is cease to be performed if performance was already underway.

Figure 8:
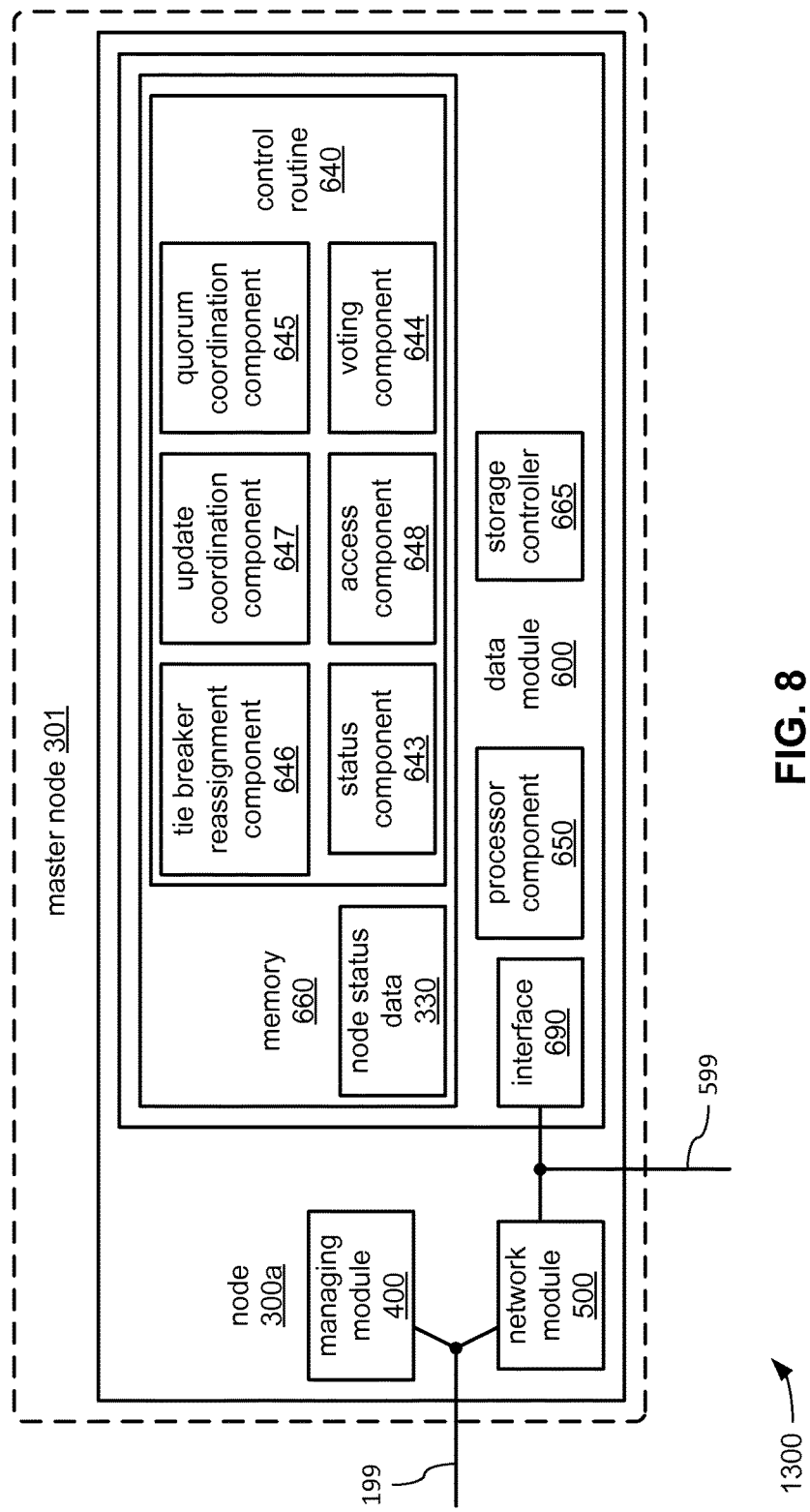
FIG. 8 illustrates an example embodiment of selecting a new tie breaker node.
Figure 9A:
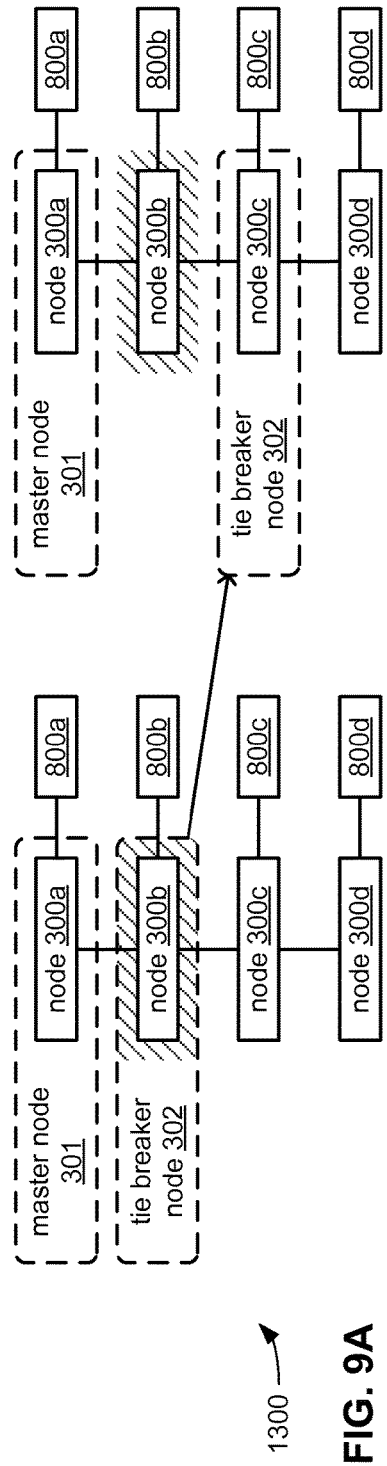
FIGS. 9A and 9B each illustrate an example embodiment of reassigning the role of tie breaker node from one node to another.
Figure 9B:
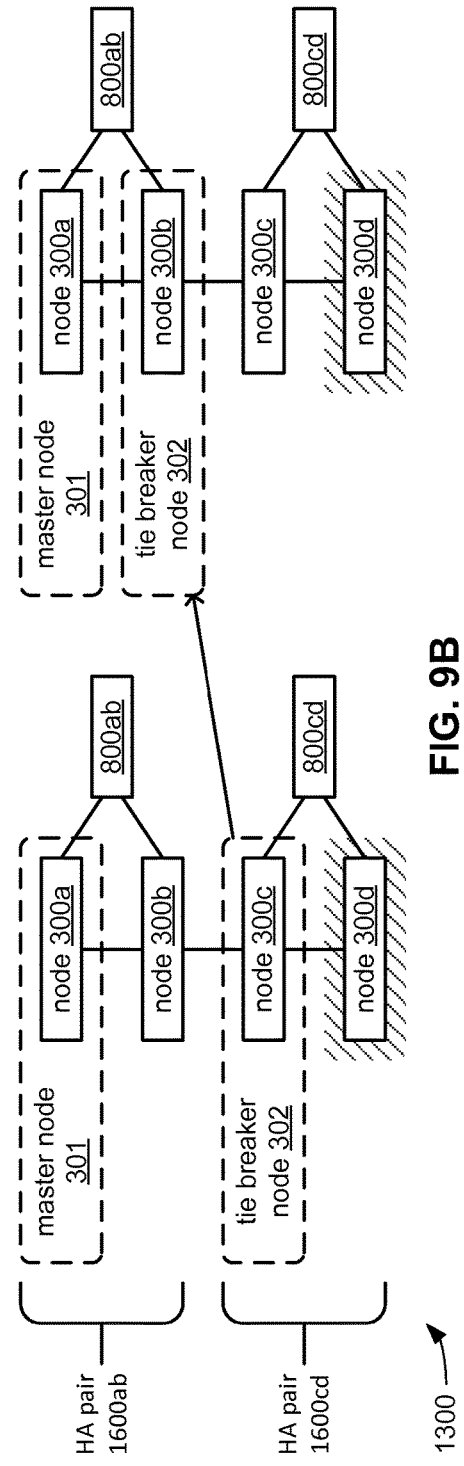

FIGS. 8, 9A and 9B each illustrate a block diagram of a portion of an embodiment of the storage cluster system 1000 in greater detail. More specifically, FIGS. 8, 9A and 9B, together, depict aspects of reassigning the role of the tie breaker node 302 for one or more quorums from one of the nodes 300a-d to another within a cluster 1300 of the storage cluster system 1000 in response to an indication of unavailability of the one of the nodes 300a-d that is currently assigned the role of the tie breaker node 302 to remain a member of that quorum. Turning to FIG. 8, as depicted, the control routine 640 of the data module 600 of each of the nodes 300a-d may incorporate a tie breaker reassignment component 646, an update coordination component 647, the status component 643, the voting component 644, the quorum coordination component 645 and/or the access component 648. In executing the control routine 640, the processor component 650 of the data module 600 of each of the nodes 300a-d may execute one or more of these components 643, 644, 645, 646, 647 and 648. Alternatively, one or more of these components 643, 644, 645, 646, 647 and 648 may be implemented with hardware-based logic. However, as depicted, with the node 300a serving in the role of the master node 301, the tie breaker reassignment component 646 and the quorum coordination component 645 may be executed within (or be otherwise active within) the node 300a, but not within the others of the nodes 300a-d.

Within the master node 301 (specifically, the node 300a, as depicted), the tie breaker reassignment component 646 may recurringly refer to the node status data 330 to determine whether there is an indication of unavailability of the one of the nodes 300a-d that is currently serving as the tie breaker node 302 for at least one of what may be multiple quorums. Such an indication of unavailability may be an indication that the one of the nodes 300a-d currently serving as the tie breaker node 302 is already currently unavailable to be a member of one or more quorums, or that a condition has arisen that creates an increased likelihood that the one of the nodes 300a-d currently serving as the tie breaker node 302 in one or more quorums will become unavailable to remain a member of those one or more quorums.

As has been discussed, there may be more than one quorum maintained among the nodes 300a-d where each of those quorums may be associated with a different type of data and/or with a different type of coordinated operation that may be performed by the nodes 300a-d on data. As has also been previously discussed, in such embodiments, the status components 643 within each of the nodes 300a-d may recurringly exchange indications of the availability of each of the nodes 300a-d to be members in each of those quorums. In such embodiments, the tie breaker reassignment component 646 may determine that the role of the tie breaker node 302 is to be reassigned to another of the nodes 300a-d in response to the one of the nodes 300a-d currently serving as the tie breaker node 302 being indicated in the copy of the node status data 330 maintained by the master node 301 as unavailable to be a member of any of the quorums. This may be based on an assumption that indications of a node becoming unavailable to be a member of less than all of the quorums may simply reflect an instance of a node experiencing either a temporary failure linked to less than all of the quorums or another temporary condition linked to less than all of the quorums (e.g., a busy condition), but that indications of a node becoming unavailable to be a member of any of the quorums is more likely the result of a failure in that node that will require reinitialization, replacement and/or repair of that node, any of which may require too long a period of time to allow either determinations of whether a quorum is present or voting without the benefit of a tie breaker node 302.

Also, and as will be explained in greater detail, the one of nodes 300a-d that currently serves as the tie breaker node 302 may transmit indications to all of the others of the nodes 300a-d that it is about to become unavailable such that it will not be able to remain a member of any of the quorums as a result of that one of the nodes 300a-d receiving a command to perform an operation that will make it so unavailable. As will be discussed, such a command may be one to shut down, reinitialize, etc.

FIG. 9A depicts an example of the role of the tie breaker node 302 being reassigned from the node 300b to the node 300c by the tie breaker reassignment component 646 as a result of an indication of unavailability of the node 300b to be a member of any quorum (depicted with cross-hatching surrounding the node 300b). Again, such an indication may be either an indication of the node 300b having already become so unavailable and/or as a result of an indication that the node 300b is about to become so unavailable.

Returning to FIG. 8, in embodiments in which the nodes 300a-d have been organized into HA pairs 1600, the tie breaker reassignment component 646 may determine that the role of the tie breaker node 302 is to be reassigned to another of the nodes 300a-d in response to an indication that the one of the nodes 300a-d currently serving as the tie breaker node 302 has taken over for its partner node in the HA pair 1600 to which it belongs. This may be based on an assumption that the processing resources of a node having to take over for its partner node in a HA pair are far closer to being fully utilized such that the node may simply be unable to spare sufficient processing resources to be available to remain a member of any quorum (e.g., unable to spare sufficient processing resources to engage in voting). This may also be based on the assumption that the situation of the node having to take over for its partner is likely caused by the partner having suffered a failure that will require reinitialization, replacement and/or repair, any of which may require too long a period of time during which the one of the nodes 300a-d currently serving as the tie breaker node 302 may become so unavailable. FIG. 9B depicts an example of the role of the tie breaker node 302 being reassigned from the node 300c to the node 300b by the tie breaker reassignment component 646 as a result of an indication of the node 300c having taken over for the node 300d following a failure in the node 300d (depicted with cross-hatching surrounding the node 300d).

Returning to FIG. 8, after determining that the role of the tie breaker node 302 is to be reassigned from the one of the nodes 300a-d that currently serves as the tie breaker node 302, effecting such a change may entail updating the copies of the node status data 330 maintained by each of the nodes 300a-d in embodiments in which the node status data 330 includes an indication of which of the nodes 300a-d is assigned the role of the tie breaker node 302. To prevent race conditions in which multiple ones of the nodes 300a-d might at least attempt to make nearly simultaneous conflicting changes in such data structures as the node status data 330, the update coordination component 647 within each of the nodes 300a-d may cooperate to enforce an interlock protocol among the nodes 300a-d in which only one of the nodes 300a-d may have the authority (also sometimes referred to as having the "token") to make such a change at a time. Thus, after determining that the role of the tie breaker node 302 is to be reassigned to another of the nodes 300a-d, the tie breaker reassignment component 646 within the master node 301 may trigger the update coordination component 647 of the master node 301 (specifically, the node 300a, as depicted) to request the authority to make a change to the node status data 330. In response, the update coordination component 647 within the master node 301 transmits a request to the others of the nodes 300a-d for that authority. Any of a variety of protocols for requesting and obtaining such authority may be used, including and not limited to a recurring interval in which the update coordination components 647 of any of the nodes 300a-d seeking such authority must submit their requests for it in a form of competition, a hierarchical ordering of the nodes 300a-d in which a higher ranked one of the nodes 300a-d may take such authority from a lower ranked one of the nodes 300a-d, etc.

Regardless of the exact mechanism by which the next one of the nodes 300a-d is selected to have the authority to make changes to the node status data 330, if none of the others of the nodes 300a-d currently has that authority (i.e., currently already has that token), then the update coordination component 647 of the master node 301 may be given that authority relatively quickly. However, if another of the nodes 300a-d currently has that authority, then the update coordination component 647 of the master node 301 may be required to wait to receive an indication that the one of the nodes 300a-d that currently has that authority has completed making its change to the node status data 330 and has relinquished that authority. The update coordination component 647 of the master node 301 may request such authority before the tie breaker reassignment component 646 uses the information within the node status data 330 to select another of the nodes 300a-d as an approach to ensuring that such information within the node status data 330 cannot be changed by another of the nodes 300 while the tie breaker reassignment component 646 within the master node 301 uses that information to select another of the nodes 300a-d to serve as the tie breaker node 302.

Upon being granted the authority to update the node status data 330, the tie breaker update component 646 may first reexamine the copy of the node status data 330 maintained by the master node 301 to see if circumstances have changed since authority to make changes to the node status data 330 was originally requested. This may be done in recognition of a possibility of a race condition in which another node that previously had the authority to make changes to the node status data 330 may have made a change that removes any need to reassign the role of tie breaker node 302 at a time following the request by the master node 301 for the authority to make changes to the node status data 330 and before the master node 301 is given that authority. Stated differently, it may be that by the time the master node 301 receives the authority needed to effect a change in which of the nodes 300a-d serves as the tie breaker node 302, the need to make such a change may no longer exist.

However, if the need to change which of the nodes 300a-d serves as the tie breaker node 302 still exists at the time the master node 301 is granted authority to update the node status data 330, then the update component 646 may, upon receipt of that authority by the master node 301, select one of the nodes 300a-d to become the next tie breaker node 302 based on any of a variety of criteria, including and not limited to which of the nodes 300a-d has the greatest amount of processing resources still available for use in participating in votes. Such a criterion may be deemed of use in selecting the next tie breaker node 302 based on an assumption that having a greater amount of processing resources available aids in preventing instances in which the next tie breaker node 302 becomes unavailable to participate in a vote as a result of limited processing resources. It should be noted that the tie breaker reassignment component 646 within the master node 301 may determine that the next tie breaker node 302 should be the same one of the nodes 300a-d that currently serves as the master node 301.

Upon determining which of the nodes 300a-d is to become the new tie breaker node 302, in some embodiments, the tie breaker reassignment component 646 may employ the authority granted to the master node 301 to simply transmit a command to all others of the nodes 300a-d to update their respective copies of the node status data 330 to reflect the new choice of the tie breaker node 302 made by the tie breaker reassignment component of the master node 301 with the expectation that each of the others of the nodes 300a-d will perform this update if they are able to. Alternatively, in other embodiments, the tie breaker reassignment component 646 may provide a request to update all of the copies of the node status data 330 maintained by each of the nodes 300a-d to the quorum coordination component 645. In so doing, the tie breaker reassignment component 646 may provide the quorum coordination component 645 with a request for a coordinated operation to be performed among all of the nodes 300a-d to effect such an update to each of their copies of the node status data 330. In response, the quorum coordination component 645 may undertake the voting process earlier described in reference to FIG. 7. Presuming that a vote to accept or reject this request does occur, the update coordination component 647 may continue to keep the authority to make a change to the node status data 330 until at least the vote is completed, and may continue to do so until this requested coordinated operation has been performed (presuming that the request is accepted).

Figure 10:
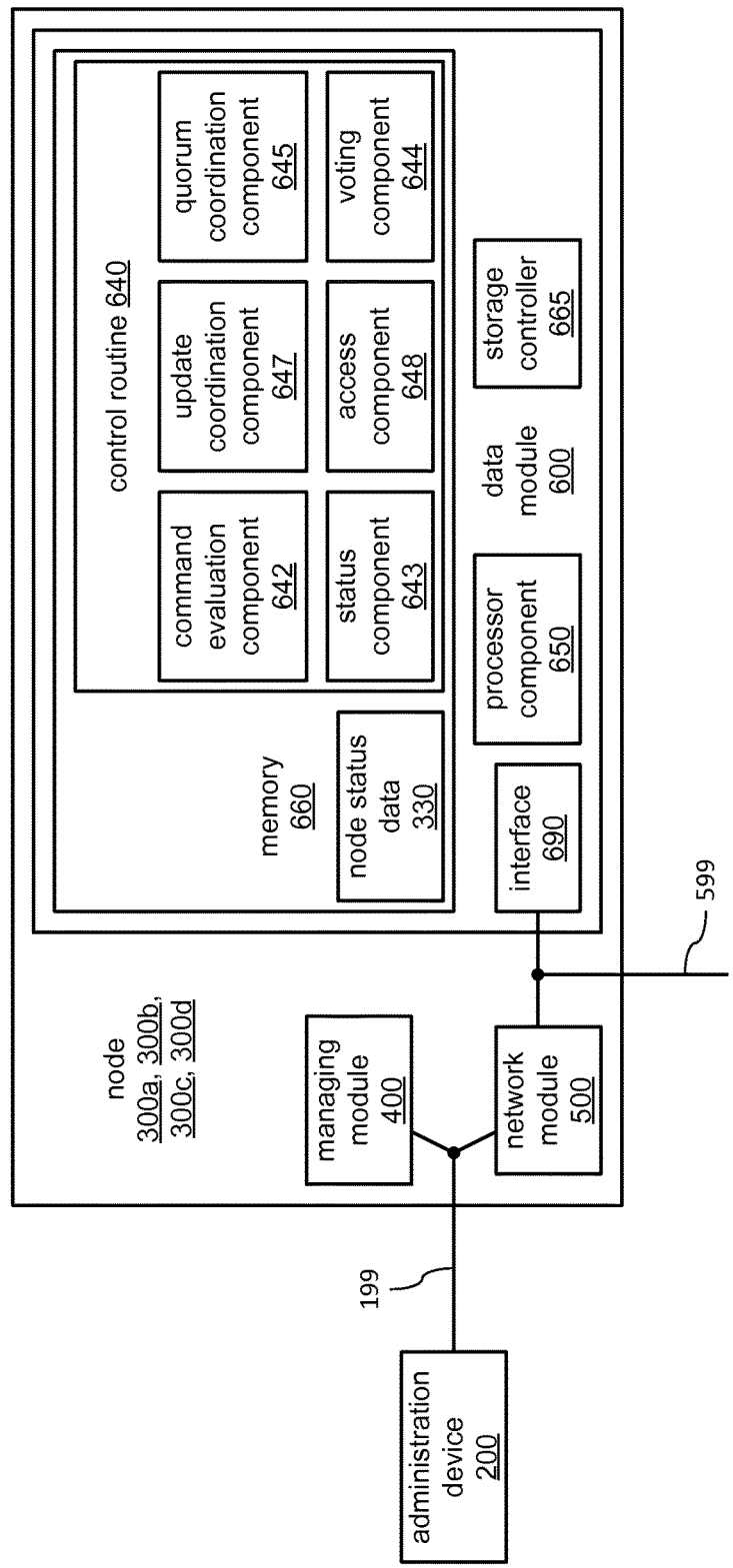
FIG. 10 illustrates an example embodiment of evaluating the effect of a received command on voting among nodes.

FIG. 10 illustrates a block diagram of a portion of an embodiment of the storage cluster system 1000 in greater detail. More specifically, FIG. 10 depicts aspects of determining whether or not to perform an operation that has been commanded to be performed by an administrator of the storage cluster system 1000 through use of the administration device 200. As depicted, the control routine 640 of the data module 600 of each of the nodes 300a-d may incorporate a command evaluation component 642, the status component 643, the voting component 644, the quorum coordination component 645, the update coordination component 647 and/or the access component 648. In executing the control routine 640, the processor component 650 of the data module 600 of each of the nodes 300a-d may execute one or more of these components 642, 643, 644, 645, 647 and 648. Alternatively, one or more of these components 642, 643, 644, 645, 647 and 648 may be implemented with hardware-based logic.

In some embodiments, an administrator of the storage cluster system 1000 may operate the administration device 200 to communicate with any of the nodes 300a-d to transmit a command thereto via the client interconnect 199 to perform any of a variety of operations. Among such operations may be shutting down, reinitializing, reassignment to a different cluster 1300, etc., that may result in whichever one of the nodes 300a-d that performs that operation becoming unavailable to be a member of any quorum among the nodes 300a-d. Upon receiving such a command, the command evaluation component 642 of the one of the nodes 300a-d that so receives that command may seek to determine whether that resulting unavailability of that one of the nodes 300a-d would impair the ability to form one or more quorums and/or impair the ability to break a tie vote within one or more quorums.

The command evaluation component 642 may first trigger the update coordination component 647 to request the authority to update the node status data 330. Like the tie breaker reassignment component 646 discussed above, the command evaluation component 642 may cause such a request for such authority to be made to enable the command evaluation component 642 to use the node status data 330 in determining whether or not performing the commanded operation would impair the ability to form a quorum or to break a tie vote within a quorum under conditions in which none of the other nodes 300a-d are able to make changes to the node status data 330. Upon being granted the authority to update the node status data 330, the command evaluation component 642 may analyze its indications of availability of each of the nodes 300a-d to be a member of each quorum, as well as its indications of which of the nodes 300a-d are currently serving as the master node 301 and/or as the tie breaker node 302 in each quorum in determining whether the one of the nodes 300a-d that received the command is able to perform that command and become unavailable to be a member of any quorum without impairing the ability to form one or more quorums and/or to break a tie vote within one or more quorums.

Again, as has been discussed, there may be more than one quorum maintained among the nodes 300a-d where each of those quorums may be associated with a different type of data and/or with a different type of coordinated operation that may be performed by the nodes 300a-d on data. Thus, in such embodiments, the command evaluation component 642 may evaluate the effect that allowing performance of the command received from the administration device 200 would have on each of those multiple quorums by causing the one of the nodes 300a-d that received that command to become unavailable. It may be that only one of those quorums would be affected in a manner that results in an immediate loss of the ability to be formed or to break a tie vote, or that creates the risk of the loss of the ability to be formed if even one more of the nodes 300a-d becomes unavailable, while each of the other quorums may not be so adversely affected. In such situations, it may be a situation associated with just one quorum that may either immediately lose the ability to be formed or to break a tie vote, or that may be put at risk of losing the ability to be formed that becomes the basis for the determination by the command evaluation component 642 of whether or not to allow the command to be performed and/or whether to first provide a warning accompanied with a request for confirmation before allowing the command to be performed.

More specifically, if, from the analysis of the node status data 330, the command evaluation component 642 determines that there is already an inability to form a particular quorum, then the command evaluation component 642 may determine that allowing the one of the nodes that received the command to become unavailable as a result of performing that command will do no harm to at least that particular quorum, since the ability to form that particular quorum is already compromised. Thus, at least with regard to that particular quorum, the command evaluation component 642 may determine that the command should be allowed to be performed. However, if, from the analysis of the node status data 330, the command evaluation component 642 determines that allowing the command to be performed would cause a current ability to form one or more quorums to be lost, then the command evaluation component 642 may determine that the command should not be allowed to be performed. More specifically, the command evaluation component 642 may not allow a command that causes the loss of a currently existing quorum to be performed.

Alternatively or additionally, if, from the analysis of the node status data 330, the command evaluation component 642 determines that allowing the command to be performed will cause the loss of an ability to break a tie vote and/or will create a risk of losing the ability to form one or more quorums if just one more of the nodes 300a-d also becomes unavailable, then the command evaluation component 642 may transmit a warning notice to that effect to the administration device 200 to be presented to the operator thereof. Such a warning may be accompanied by a request to also be presented to the operator for the operator to confirm whether or not to proceed with performing the command in spite of this risk. The command evaluation component 642 may similarly transmit such a warning notice and/or request for confirmation to proceed if, from the analysis of the node status data 330, the command evaluation component 642 determines that allowing the command to be performed will cause the loss of the one of the nodes 300a-d that currently serves as the master node 301 and/or serves as the tie breaker node 302 in one or more quorums. If, where such confirmation is requested, the response received from the administration device 200 is to proceed, then the command evaluation component 642 may allow the command to be performed.

Where the command evaluation component 642 does not allow the command received from the administration device 200 to be performed, the command evaluation component 642 may transmit an indication to the effect that the command is rejected to the administration device 200, and may release the earlier granted authority to update the node status data 330. The command evaluation component 642 may then take no further action with regard to that command.

However, where the command evaluation component 642 allows the command to be performed, or if the response to the request for confirmation that is received from the administration device 200 is to proceed with performing the command, then the command evaluation component 642 may transmit an indication to the effect that the command is accepted to the administration device 200. In a manner similar to the earlier described performance of an update to the node status data 330 to reassign the tie breaker node 302, the command evaluation component 642 may also provide the quorum coordination component 645 with a request for a coordinated operation to update all of the copies of the node status data 330 maintained by each of the nodes 300a-d with a preemptive indication that the one of the nodes 300a-d that received the command is about to become unavailable for voting. Presuming that the resulting vote results in acceptance of the request to perform the coordinated operation, each of the nodes 300a-d may update its copy of the node status data 330 to so reflect the impending unavailability of the one of the nodes 300a-d that received the command.

In various embodiments, each of the processor components 450, 550 and 650 may include any of a wide variety of commercially available processors. Also, one or more of these processor components may include multiple processors, a multi-threaded processor, a multi-core processor (whether the multiple cores coexist on the same or separate dies), and/or a multi processor architecture of some other variety by which multiple physically separate processors are in some way linked.

In various embodiments, each of the control routines 440, 540 and 640 may include one or more of an operating system, device drivers and/or application-level routines (e.g., so-called "software suites" provided on disc media, "applets" obtained from a remote server, etc.). As recognizable to those skilled in the art, each of the control routines 440, 540 and 640, including the components of which each may be composed, are selected to be operative on whatever type of processor or processors may be selected to implement applicable ones of the processor components 450, 550 or 650, or to be operative on whatever type of processor or processors may be selected to implement a shared processor component. In particular, where an operating system is included, the operating system may be any of a variety of available operating systems appropriate for corresponding ones of the processor components 450, 550 or 650, or appropriate for a shared processor component. Also, where one or more device drivers are included, those device drivers may provide support for any of a variety of other components, whether hardware or software components, of corresponding ones of the modules 400, 500 or 600.

In various embodiments, each of the memories 460, 560 and 660 may be based on any of a wide variety of information storage technologies, possibly including volatile technologies requiring the uninterrupted provision of electric power, and possibly including technologies entailing the use of machine-readable storage media that may or may not be removable. Thus, each of these memories may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a RAID array). It should be noted that although each of these memories is depicted as a single block, one or more of these may include multiple storage devices that may be based on differing storage technologies. Thus, for example, one or more of each of these depicted memories may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these memories may be made up of multiple storage components based on identical storage technology, but which may be maintained separately as a result of specialization in use (e.g., some DRAM devices employed as a main memory while other DRAM devices employed as a distinct frame buffer of a graphics controller).

In various embodiments, the interfaces 490, 590 and 690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 11:
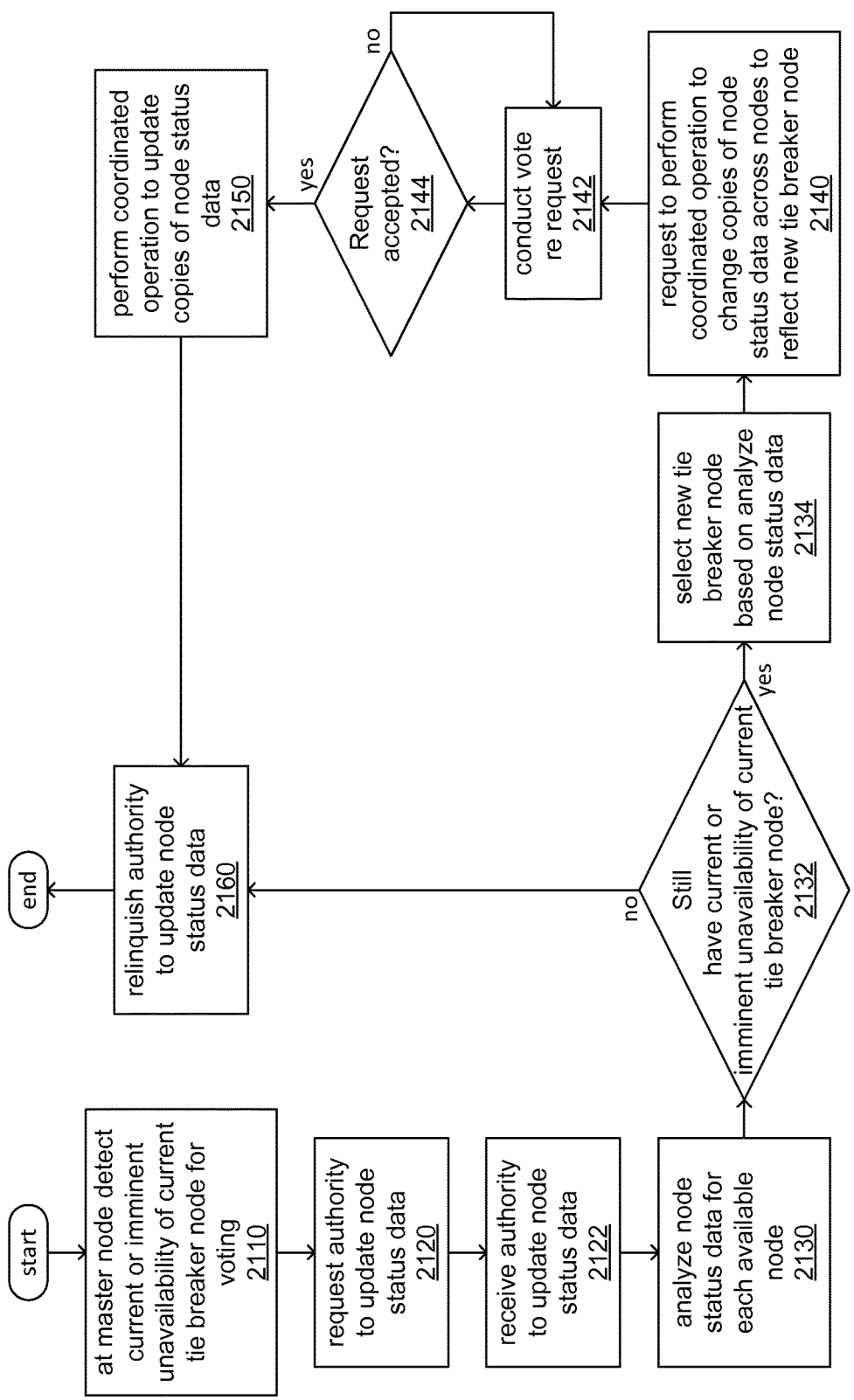
FIG. 11 illustrates a first logic flow according to an embodiment.

FIG. 11 illustrates one embodiment of a logic flow 2100. The logic flow 2100 may be representative of some or all of the operations executed by one or more embodiments described herein. More specifically, the logic flow 2100 may illustrate operations performed by the processor component 650 in executing at least the control routine 640, and/or performed by other component(s) of the master node 301.

At 2110, a processor component of the master node of a cluster made up of multiple nodes in a storage cluster system (e.g., the processor component 650 of whichever one of the nodes 300a-d serves as the master node 301 in a cluster 1300 of the storage cluster system 1000) detects current or imminent unavailability of the tie breaker node (e.g., whichever one of the nodes 300a-d serves as the tie breaker node 302 in the cluster 1300). As previously discussed, unavailability of the tie breaker node may be detected by recurring analysis of the node status data 330 for an indication of the tie breaker node ceasing to be available in all of multiple quorums and/or a preemptive indication that the tie breaker node will become unavailable.

At 2120, the processor component may request authority be granted to the master node to update the copies of the node status data (e.g., the node status data 330) maintained by each of the nodes. As previously discussed, obtaining such authority may be a mechanism to prevent other nodes from changing the node status data while it is being analyzed, thereby avoiding a possible race condition. At 2122, the requested authority may be granted to the master node.

At 2130, the processor component may analyze the copy of the node status data maintained by the master node to determine whether there is still an indication therein of current or imminent unavailability of the tie breaker node. As previously discussed, such an analysis may be performed following granting of the earlier requested authority as it allows confirmation of whether there is such an indication concerning the tie breaker node under conditions in which race conditions that could change the contents of the node status data cannot occur. If, at 2132, such an indication of current or imminent unavailability of the current tie breaker node no longer exists within the node status data, then the processor component may relinquish the earlier requested authority to update the node status data at 2160.

However, if there is still such an indication within the node status data at 2132, then the processor component may further analyze the copy of the node status data maintained by the master node to select a node other than the node that currently serves as the tie breaker node to become the new tie breaker node at 2134. At 2140, the processor component may generate and distribute among the other nodes a request to perform a coordinated operation to update the copies of the node status data maintained by each of the other nodes to reflect the change to the new tie breaker node.

At 2142, the processor component conducts a vote among the nodes to either accept or reject the request to perform the coordinated operation. More precisely, the processor awaits receipt of indications from each of the other nodes as to whether each is able to perform the requested coordinated operation. If the request is rejected at 2144, the processor component may trigger a repeat of the vote at 2142. Such repetition of the vote to obtain acceptance of the request to perform the coordinated action may be based on an assumption that a rejection of a coordinated action may be at least partly due to one or more of the nodes being only temporarily unable to perform the operation due to another operation that may already be underway therein.

At 2150, following acceptance of the request, processor components within multiple ones of the nodes perform the coordinated operation to update their copies of the node status data. At 2160, following such updating, the processor component of the master node relinquishes the earlier granted authority to update the node status data.

Figure 12:
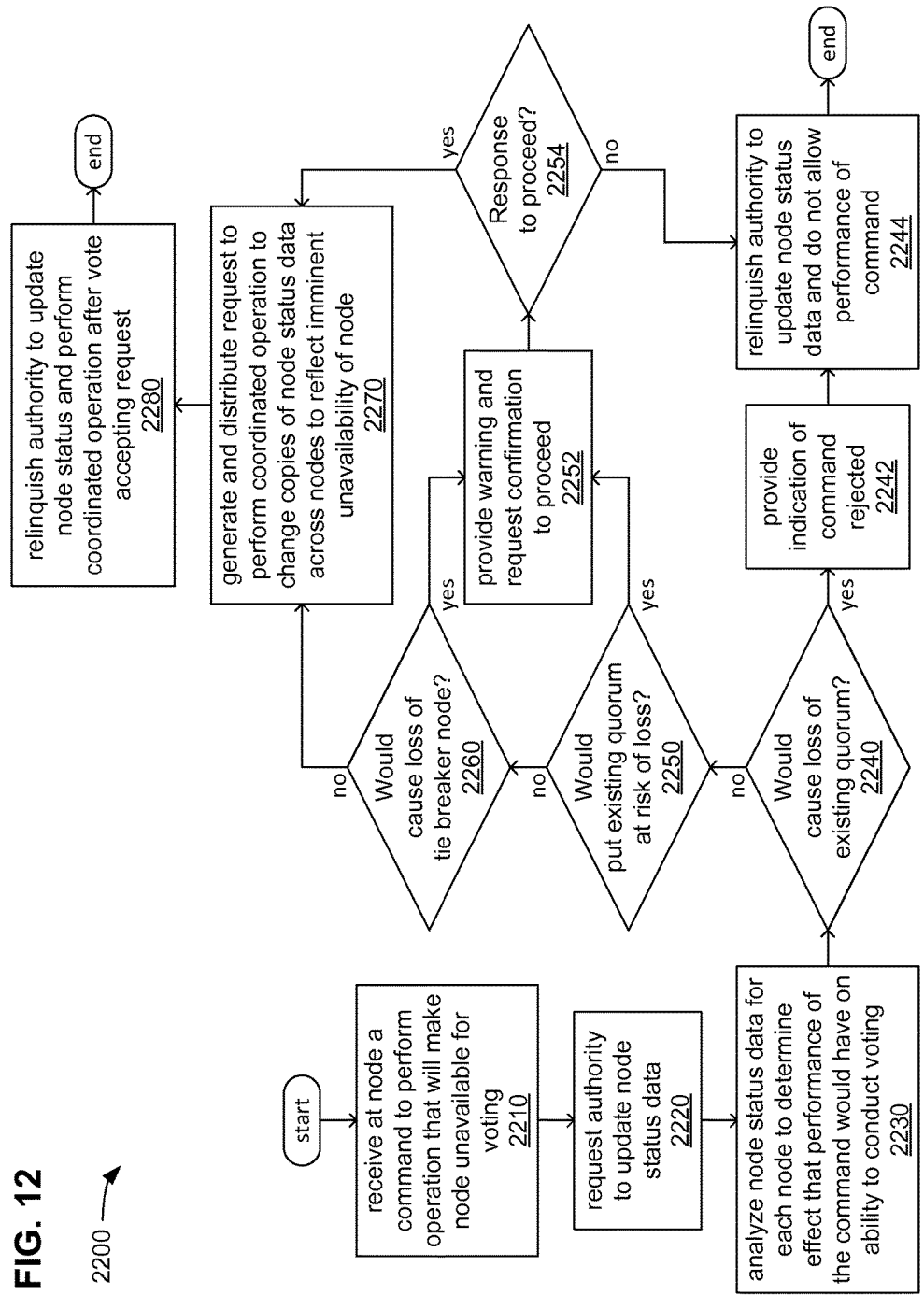
FIG. 12 illustrates a second logic flow according to an embodiment.

FIG. 12 illustrates one embodiment of a logic flow 2200. The logic flow 2200 may be representative of some or all of the operations executed by one or more embodiments described herein. More specifically, the logic flow 2200 may illustrate operations performed by the processor component 650 in executing at least the control routine 640, and/or performed by other component(s) of one of the nodes 300a-d.

At 2210, a processor component of one of the nodes of a cluster made up of multiple nodes in a storage cluster system (e.g., the processor component 650 of one of the nodes 300a-d in a cluster 1300 of the storage cluster system 1000) receives a command to perform an operation that will render the node unavailable to be a member of any quorum. As previously discussed, the administration device 200 and/or another device may transmit a command to one of the nodes 300a-d to perform an operation that may render it unavailable to be a member of any quorum, such as reinitializing, shutting down, etc.

At 2220, the processor component may request authority to update the copies of the node status data (e.g., the node status data 330) maintained by each of the nodes. As previously discussed, obtaining such authority may be a mechanism to prevent a race condition in which other nodes may change the node status data while the node status data is being analyzed, thereby avoiding a possible race condition. Obtaining such authority would also prevent other nodes from making changes to the node status during times at which the processor may cause various warnings and/or other notices concerning the condition of the cluster to be presented to the administrator so as to ensure that the information so presented is not based on unstable information contained within the node status data.

At 2230, and after being granted such authority, the processor component may analyze the copy of the node status data maintained by its node to determine what effect the performance of the command would have on the ability to form one or more quorums and/or to break tie votes within one or more quorums. As previously discussed, such an analysis may include a separate analysis of the effects of performing the command on the ability to conduct voting for each of multiple quorums that may each be associated with a different type of data and/or a different type of coordinated operation.

At 2240, a check may be made as to whether the performance of the command would cause the loss of a currently existing quorum. If so, then the processor component may provide an indication (e.g., through the administration device 200) that the command is rejected at 2242. Then, at 2244, the processor component may relinquish the earlier granted authority to update the copies of the node status data maintained by each of the nodes, and may not allow performance of the command.

However, if the performance of the command would not cause the loss of a currently existing quorum at 2240, then a check may be made at 2250 as to whether the performance of the command would put an existing quorum at risk of being lost if even one more node were to become unavailable. If so, then the processor component may provide a warning (e.g., through the administration device 200) of the risk of loss of ability to form that quorum along with a request for confirmation as to whether or not to proceed with performing the command at 2252. If the response to the request for confirmation is a further instruction to not proceed at 2254, then the processor component may relinquish the earlier granted authority to update the copies of the node status data maintained by each of the nodes and may not allow performance of the command at 2244. However, if the response to the request for confirmation is a further instruction to proceed 2254, then the processor component may generate and distribute among the other nodes a request to perform a coordinated operation to update the copies of the node status data maintained by each of the other nodes to reflect the imminent unavailability of the node that received the command at 2270.

However, if the performance of the command would not place an existing quorum at risk of being lost at 2250, then a check may be made at 2260 as to whether the performance of the command would cause the loss of the tie breaker node (e.g., the tie breaker node 302). If so, then the processor component may provide a warning (e.g., through the administration device 200) of the risk of loss of ability to break a tie vote along with a request for confirmation as to whether or not to proceed with performing the command at 2252.

However, if the performance of the command would not cause the loss of the tie breaker node at 2260, then the processor component may generate and distribute among the other nodes a request to perform a coordinated operation to update the copies of the node status data maintained by each of the other nodes to reflect the imminent unavailability of the node that received the command at 2270.

At 2280, following a vote among the nodes that accepts the request to perform the coordinated operation, processor components within each of the nodes may so perform the coordinated operation. Then, the processor component may relinquish the earlier granted authority to update the node status data.

Figure 13:
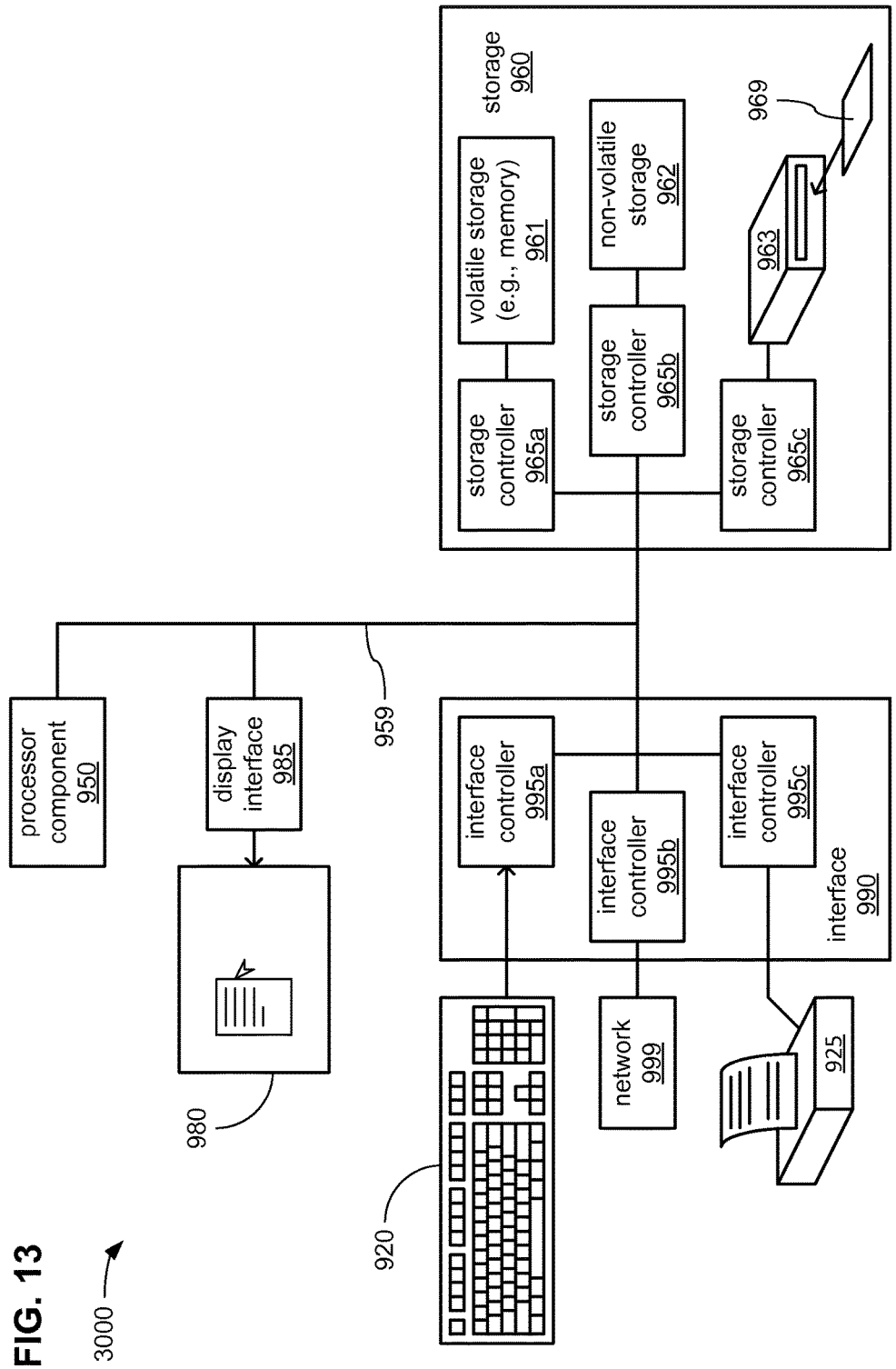
FIG. 13 illustrates a processing architecture according to an embodiment.

FIG. 13 illustrates an embodiment of an exemplary processing architecture 3000 suitable for implementing various embodiments as previously described. More specifically, the processing architecture 3000 (or variants thereof) may be implemented as part of one or more of the client devices 100, the administration device 200, the nodes 300, the managing modules 400, the network modules 500, the data modules 600, and the sets of storage devices 800a, 800b, 800c, 800d, 800ab or 800cd. It should be noted that components of the processing architecture 3000 are given reference numbers in which the last two digits correspond to the last two digits of reference numbers of at least some of the components earlier depicted and described as part of the devices 100, 200 and/or 800; and/or the modules 400, 500 and 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, an internal storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the internal storage 960. Coupling 959 may further couple the processor component 950 to one or more of the interface 990 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 may include any of a wide variety of commercially available processors, employing any of a wide variety of technologies and implemented with one or more cores physically combined in any of a number of ways.

As previously discussed, the internal storage 960 may be made up of one or more distinct storage devices based on any of a wide variety of technologies or combinations of technologies. More specifically, as depicted, the internal storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the internal storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for long-term storage not requiring the continuing presence of the machine-readable storage medium 969 and/or the volatile storage 961 to enable more rapid access by the processor component 950 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The invention claimed is:

1. A computing apparatus comprising:
   a memory containing machine readable medium comprising machine executable code having stored thereon instructions for maintaining device coordination in a storage cluster system; and
   a processor coupled to the memory, the processor configured to execute the machine executable code to cause the processor to:
   enable exchanges of indications of status of multiple nodes, each node of the multiple nodes to oversee storage of a separate copy of client data, and a first node of the multiple nodes to serve as a tie breaker node in determinations of whether there is availability of sufficient nodes of the multiple nodes to form a quorum;
   coordinate performance of a coordinated operation among the multiple nodes to alter the copies of the client data based on the current status of the quorum, including the tie breaker node, the tie breaker node assigned a weighting value such that the tie breaker node is treated as comprising more than one node in determinations of whether there is availability of sufficient nodes of the multiple nodes to form the quorum and such that a vote by the tie breaker node is treated as comprising more than one vote in determining whether a majority of the nodes of the multiple nodes are able to perform a coordinated operation; and
   analyze the indications of status to determine whether the first node has failed; and
   reassign service from the first node to a second node of the multiple nodes in response to a determination that the first node has failed.

2. The apparatus of claim 1, wherein the processor is further configured to execute the machine executable code to:
   maintain a copy of the node status data;
   recurringly exchange the indications of status with at least one other node of the multiple nodes; and
   recurringly update the copy of the node status data with the exchanged indications of status.

3. The apparatus of claim 2, wherein for the coordinate performance of the coordinated operation the processor is further configured to execute the machine executable code to:
request exclusive authority to update the separate copies of the node status data to become the only node of the multiple nodes able to update the separate copies of the node status data; and
analyze the copy of the node status data maintained within the memory when the node has the authority to determine whether the first node has failed based on whether the first node is indicated in the copy of the node status data to be unavailable to remain within all of multiple quorums.

4. The apparatus of claim 1, wherein for the analyze the indications of status the processor is further configured to execute the machine executable code to:
in response to receipt of a request to perform the coordinated operation from another device, analyze the indications of status to determine the current status of the quorum, taking into account the weighting value of the tie breaker node, and reject the request to perform the coordinated operation in response to loss of the quorum.

5. The apparatus of claim 4, wherein for the analyze the indications of status the processor is further configured to execute the machine executable code to:
in response to current availability of a sufficient quantity of nodes of the multiple nodes to form the quorum, relay the request to the multiple nodes, await votes from each other node of the quorum indicating whether each other node of the quorum is able to perform the coordinated operation, and determine whether to accept the request based on whether the votes indicate that a majority of the nodes of the quorum are able to perform the coordinated operation, taking into account the weighting value associated with the vote from the tie breaker node.

6. The apparatus of claim 5, wherein the processor is further configured to execute the machine executable code to:
interact with a storage device to determine whether the node is able to perform the coordinated operation and to perform the coordinated operation; and
provide a vote indicating the determination of whether the node is able to perform the coordinated operation, wherein the provided vote is included with the votes received from the other nodes to determine whether a majority of the nodes of the quorum are able to perform the coordinated operation.

7. A method comprising:
exchanging, through a node of multiple nodes, indications of status of the multiple nodes, each node of the multiple nodes to oversee storage of a separate copy of client data, and a first node of the multiple nodes to serve as a tie breaker node in determinations of whether there is availability of sufficient nodes of the multiple nodes to form a quorum;
analyzing the indications of status to determine a current status of the quorum;
coordinating performance of a coordinated operation among the multiple nodes to alter the copies of the client data based on the current status of the quorum, including the tie breaker node, the tie breaker node assigned a weighting value such that the tie breaker node is treated as comprising more than one node in determinations of whether there is availability of sufficient nodes of the multiple nodes to form the quorum and such that a vote by the tie breaker node is treated as comprising more than one vote in determining whether a majority of the nodes of the multiple nodes are able to perform a coordinated operation;
analyzing the indications of status to determine whether the first node has failed; and
reassigning service from the first node to a second node of the multiple nodes in response to a determination that the first node has failed.

8. The method of claim 7, each node of the multiple nodes to maintain a separate copy of a node status data, the node status data comprising indications of the states of the multiple nodes, and the method comprising:
obtaining, at the node, exclusive authority to update the separate copies of the node status data to become the only node of the multiple nodes able to update the separate copies of the node status data, the node status data comprising indications of states of the multiple nodes; and
analyzing the copy of the node status data maintained by the node when the node has the authority to determine whether the first node has failed based on whether the first node is indicated in the copy of the node status data to be unavailable to remain within all of multiple quorums.

9. The method of claim 7, comprising: in response to receipt of a request to perform the coordinated operation from another device, analyze the indications of status to determine the current status of the quorum, taking into account the weighting value of the tie breaker node; and
rejecting the request to perform the coordinated operation in response to loss of the quorum.

10. The method of claim 9, comprising:
in response to current availability of a sufficient quantity of nodes of the multiple nodes to form the quorum, relaying the request to the multiple nodes;
awaiting receipt of votes from each other node of the quorum indicating whether each other node of the quorum is able to perform the coordinated operation; and
determining whether to accept the request based on whether the votes indicate that a majority of the nodes of the quorum are able to perform the coordinated operation, taking into account the weighting value associated with the vote from the tie breaker node.

11. The method of claim 10, comprising:
determining whether the node is able to perform the coordinated operation; and
taking into account a vote by the node as to whether the node is able to perform the coordinated operation in determining whether the votes indicate that a majority of the nodes of the quorum are able to perform the coordinated operation.

12. The method of claim 7, comprising reassigning service as the tie breaker node from the first node to the second node in response to the first node serving as a member of a high availability (HA) pair that comprises the first node and a third node of the multiple nodes, the third node suffering a failure and the first node taking over for the third node as a result of the failure of the third node.

13. At least one non-transitory computer readable medium having stored thereon instructions for performing a method comprising machine executable code which when executed by at least one machine, cause the machine to:
exchange, through a node of multiple nodes of a storage cluster system, indications of status of the multiple nodes, each node of the multiple nodes to oversee storage of a separate copy of client data, and a first node of the multiple nodes to serve as a tie breaker node in determinations of whether there is availability of sufficient nodes of the multiple nodes to form a quorum;

analyze the indications of status to determine a current status of the quorum;

coordinate performance of a coordinated operation among the multiple nodes to alter the copies of the client data based on the current status of the quorum, including the tie breaker node, the tie breaker node assigned a weighting value such that the tie breaker node is treated as comprising more than one node in determinations of whether there is availability of sufficient nodes of the multiple nodes to form the quorum and such that a vote by the tie breaker node is treated as comprising more than one vote in determining whether a majority of the nodes of the multiple nodes are able to perform a coordinated operation;

analyze the indications of status to determine whether the first node has failed; and reassign service from the first node to a second node of the multiple nodes in response to a determination that the first node has failed.

14. The medium of claim 13, each node of the multiple nodes to maintain a separate copy of a node status data, the node status data comprising indications of the states of the multiple nodes, and wherein the machine executable code when executed by the machine further causes the machine to:

recurringly exchange indications of status of the multiple nodes with at least one other node of the multiple nodes;

recurringly update indications of status of the multiple nodes within the copy of the node status data maintained by the node based on the recurringly exchanged indications;

obtain, at the node, exclusive authority to update the separate copies of the node status data to become the only node of the multiple nodes able to update the separate copies of the node status data, the node status data comprising indications of states of the multiple nodes; and analyze the copy of the node status data maintained by the node when the node has the authority to determine whether the first node has failed based on whether the first node is indicated in the copy of the node status data to be unavailable to remain within all of multiple quorums.

15. The medium of claim 13, wherein the machine executable code when executed by the machine further causes the machine to:

in response to receiving a request to perform the coordinated operation among the multiple nodes, and analyze the indications of status to determine whether there is current availability of a sufficient quantity of nodes of the multiple nodes to form the quorum, taking into account the weighting value of the tie breaker node; and reject the request to perform the coordinated operation in response to lack of current availability of a sufficient quantity of nodes to form the quorum.

16. The medium of claim 15, wherein the machine executable code when executed by the machine further causes the machine to:

in response to current availability of a sufficient quantity of nodes of the multiple nodes to form the quorum, relay the request to the multiple nodes;

await receipt of votes from each other node of the quorum indicating whether each other node of the quorum is able to perform the coordinated operation; and determine whether to accept the request based on whether the votes indicate that a majority of the nodes of the multiple nodes are able to perform the coordinated operation, taking into account the weighting value of the tie breaker node.

17. The medium of claim 14, each node of the multiple nodes to maintain a separate copy of a node status data, the node status data comprising indications of the states of the multiple nodes, and wherein the machine executable code when executed by the machine further causes the machine to:

recurringly exchange indications of status of the multiple nodes with at least one other node of the multiple nodes;

recurringly update indications of status of the multiple nodes within the copy of the node status data maintained by the node based on the recurringly exchanged indications;

obtain, at the node, exclusive authority to update the separate copies of the node status data to become the only node of the multiple nodes able to update the separate copies of the node status data, the node status data comprising indications of states of the multiple nodes; and analyze the copy of the node status data maintained by the node when the node has the authority to determine whether a third node with which the first node is partnered to form a high availability (HA) pair has failed and to determine whether the first node has taken over for the third node; and reassign service as the tie breaker node from the first node to the second node in response to determinations that the third node as failed and that the first node has taken over the third node.

* * * * *